(12) United States Patent
Kim et al.

(10) Patent No.: US 10,887,942 B2
(45) Date of Patent: *Jan. 5, 2021

(54) METHOD AND APPARATUS FOR TRANSMITTING/RECEIVING DATA IN MOBILE COMMUNICATION SYSTEM

(71) Applicant: Samsung Electronics Co., Ltd., Suwon-si (KR)

(72) Inventors: Soeng Hun Kim, Yongin-si (KR); Gert-Jan Van Lieshout, Middlesex (GB); Sang Bum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,875

(22) Filed: Jul. 22, 2019

(65) Prior Publication Data

US 2019/0342938 A1 Nov. 7, 2019

Related U.S. Application Data

(63) Continuation of application No. 15/483,979, filed on Apr. 10, 2017, now Pat. No. 10,362,621, which is a
(Continued)

(30) Foreign Application Priority Data

Apr. 10, 2012 (KR) .................. 10-2012-0037355

(51) Int. Cl.
*H04W 76/27* (2018.01)
*H04W 76/28* (2018.01)
(Continued)

(52) U.S. Cl.
CPC ....... *H04W 76/27* (2018.02); *H04W 12/0017* (2019.01); *H04W 12/02* (2013.01);
(Continued)

(58) Field of Classification Search
CPC . H04W 76/27; H04W 76/28; H04W 12/0017; H04W 12/02; H04W 28/06;
(Continued)

(56) References Cited

U.S. PATENT DOCUMENTS

| 8,335,197 | B2 | 12/2012 | Jeong et al. | |
| 8,655,305 | B2 * | 2/2014 | Tiwari | H04W 76/50 455/404.1 |

(Continued)

FOREIGN PATENT DOCUMENTS

| EP | 1636922 B1 | 3/2008 |
| EP | 1973355 A1 | 9/2008 |

(Continued)

OTHER PUBLICATIONS

ETSI TS 124 301 V9.5.0 (Jan. 2011) Technical Specification Universal Mobile Telecommunications System (UMTS);LTE;Non-Access-Stratum (NAS) protocol for Evolved Packet System (EPS); Stage 3 (3GPP TS 24.301 version 9.5.0 Release 9) (Year: 2011).*

(Continued)

*Primary Examiner* — Chi H Pham
*Assistant Examiner* — Weibin Huang

(57) ABSTRACT

The present invention relates to a method and an apparatus for transmitting/receiving data, and a method for a user equipment transmitting data, according to one embodiment of the present invention, comprises: a step of determining conditions for determining whether a condition for transmitting short data is satisfied, when data to be transmitted is generated; and a step of including the data to be transmitted in a radio resource control (RRC) connection setup completion message and transmitting same, when the condition for transmitting the short data is satisfied. According to one embodiment of the present invention, the problem of network overload can be prevented by reducing signaling (Continued)

overhead when processing small packets, which are generated intermittently, in the mobile communication system, and an apparatus and a method for enhancing battery performance in the user equipment can be effectively provided.

18 Claims, 19 Drawing Sheets

Related U.S. Application Data continuation of application No. 14/111,530, filed as application No. PCT/KR2012/002726 on Apr. 10, 2012, now Pat. No. 9,622,164.

(60) Provisional application No. 61/473,966, filed on Apr. 11, 2011.

(51) Int. Cl.
*H04W 52/02* (2009.01)
*H04W 74/08* (2009.01)
*H04W 12/00* (2009.01)
*H04W 48/20* (2009.01)
*H04W 28/06* (2009.01)
*H04W 12/02* (2009.01)
*H04W 72/10* (2009.01)
*H04W 36/00* (2009.01)
*H04W 36/04* (2009.01)
*H04W 92/00* (2009.01)
*H04W 12/10* (2009.01)
*H04W 84/04* (2009.01)
*H04W 40/02* (2009.01)

(52) U.S. Cl.
CPC ....... *H04W 28/06* (2013.01); *H04W 36/0083* (2013.01); *H04W 36/04* (2013.01); *H04W 48/20* (2013.01); *H04W 52/0216* (2013.01); *H04W 72/10* (2013.01); *H04W 74/08* (2013.01); *H04W 76/28* (2018.02); *H04W 12/10* (2013.01); *H04W 40/02* (2013.01); *H04W 52/0254* (2013.01); *H04W 84/045* (2013.01); *H04W 92/00* (2013.01); *Y02D 30/70* (2020.08)

(58) Field of Classification Search
CPC . H04W 36/0083; H04W 36/04; H04W 48/20; H04W 52/0216; H04W 72/10; H04W 74/08
See application file for complete search history.

(56) References Cited

U.S. PATENT DOCUMENTS

| | | | |
|---|---|---|---|
| 9,622,164 B2* | 4/2017 | Kim | H04W 72/10 |
| 9,749,904 B1* | 8/2017 | Zhang | H04W 8/04 |
| 2004/0229626 A1 | 11/2004 | Yi et al. | |
| 2005/0176474 A1 | 8/2005 | Lee et al. | |
| 2008/0031128 A1 | 2/2008 | Jang et al. | |
| 2008/0102749 A1 | 5/2008 | Becker | |
| 2008/0305790 A1 | 12/2008 | Wakabayashi | |
| 2009/0015408 A1 | 1/2009 | Asai et al. | |
| 2009/0025060 A1 | 1/2009 | Mukherjee et al. | |
| 2009/0154408 A1 | 6/2009 | Jeong et al. | |
| 2009/0163211 A1 | 6/2009 | Kitazoe et al. | |
| 2009/0221289 A1 | 9/2009 | Xu et al. | |
| 2009/0232118 A1 | 9/2009 | Wang et al. | |
| 2009/0238117 A1 | 9/2009 | Somasundaram et al. | |
| 2009/0257353 A1 | 10/2009 | Song et al. | |
| 2009/0320100 A1 | 12/2009 | Kitazoe | |
| 2010/0075667 A1* | 3/2010 | Nakamata | H04W 36/0055 455/432.3 |
| 2010/0103873 A1 | 4/2010 | Buracchini | |
| 2010/0135159 A1 | 6/2010 | Chun et al. | |
| 2010/0234027 A1 | 9/2010 | Han et al. | |
| 2010/0265867 A1 | 10/2010 | Becker et al. | |
| 2010/0273515 A1 | 10/2010 | Fabien et al. | |
| 2011/0116427 A1 | 5/2011 | Chang et al. | |
| 2012/0039472 A1* | 2/2012 | Liu | H04W 12/0401 380/270 |
| 2012/0057490 A1 | 3/2012 | Park et al. | |
| 2012/0147830 A1 | 6/2012 | Lohr et al. | |
| 2012/0269099 A1* | 10/2012 | Chin | H04L 65/1016 370/259 |
| 2012/0302196 A1* | 11/2012 | Chin | H04W 76/25 455/404.1 |
| 2013/0021940 A1* | 1/2013 | Keskitalo | H04W 36/0083 370/252 |
| 2013/0100895 A1 | 4/2013 | Aghili et al. | |
| 2013/0308545 A1 | 11/2013 | Lee et al. | |
| 2013/0308564 A1* | 11/2013 | Jain | H04B 7/0697 370/329 |

FOREIGN PATENT DOCUMENTS

| | | |
|---|---|---|
| EP | 1865630 B1 | 3/2009 |
| EP | 2265077 A1 | 12/2010 |
| KR | 10-2004-0098126 A | 11/2004 |
| KR | 10-2006-0117159 A | 11/2006 |
| KR | 10-2007-0009333 A | 1/2007 |
| KR | 10-2008-0012443 A | 2/2008 |
| KR | 10-2009-0038752 A | 4/2009 |
| KR | 10-2009-0086441 A | 8/2009 |
| KR | 10-2009-0104471 A | 10/2009 |
| KR | 10-2010-0104022 A | 9/2010 |
| KR | 10-2010-0108459 A | 10/2010 |
| KR | 10-2010-0126509 A | 12/2010 |
| KR | 10-1717522 B1 | 3/2017 |
| WO | 2008119380 A1 | 10/2008 |
| WO | 2011039636 A2 | 4/2011 |

OTHER PUBLICATIONS

The First Office Action in connection with Chinese Application No. 201710352071.1 dated Feb. 6, 2020, 13 pages.
European Office Action dated Jul. 9, 2015 in connection with European Patent Application No. 12770987.1; 5 pages.
Extended European Search Report dated Aug. 26, 2014 in connection with European Patent Application No. 12770987; 7 pages.
3GPP TSG SA WG2 Meeting #84; "M2M: Small data transmission using optimised SMS"; Apr. 11-15, 2011; Bratislava, Slovakia; 4 pages.
International Search Report dated Oct. 30, 2012 in connection with International Patent Application No. PCT/KR2012/002726, 3 pages.
Written Opinion of International Searching Authority dated Oct. 30, 2012 in connection with International Patent Application No. PCT/KR2012/002726, 4 pages.
Catt, "Short Data Transferring in LTE_IDLE", 3GPP TSG-RAN2 Meeting #50, R2-060082, Jan. 2006, 2 pages.
European Patent Office, "European Search Report," Application No. EP 17 18 0373, dated Aug. 25, 2017, 7 pages.
Japan Patent Office, "Notification of Reasons for Refusal," Application No. JP 2016-209811, dated Oct. 16, 2017, 7 pages.
Korean Intellectual Property Office, "Office Action," Application No. KR 10-2012-0037248, dated Nov. 13, 2017, 12 pages.
3GPP TS 36.304 V10.1.0 (Mar. 2011), 3rd Generation Partnership Project; Technical Specification Group Radio Access Network; Evolved Universal Terrestrial Radio Access (E-UTRA); User Equipment (UE) procedures in idle mode (Release 10), 34 pages.
3GPP TS 36.331 V10.1.0 (Mar. 2011), 3rd Generation Partnership Project; Technical Specification Group Radio Access Network; Evolved Universal Terrestrial Radio Access (E-UTRA); Radio Resource Control (RRC); Protocol specification (Release 10), 290 pages.
Huawei, Hisilicon, "Remaining issues regarding RLF reporting for MDT," R2-111239, 3GPP TSG-RAN WG2 Meeting #73, Taipei, Feb. 21-25, 2011, 3 pages.

(56) References Cited

OTHER PUBLICATIONS

Huawei, Hisilicon, "Extension to Radio Link Failure reporting for MDT and MRO," R2-110101, 3GPP TSG-RAN WG2 Meeting #72bis, Dublin, Ireland, Jan. 17-21, 2011, 5 pages.
LG Electronics Inc., "Clarification on cell reselection when camping on a CSG cell with dedicated priorities other than the serving frequency," R2-112393, 3GPP TSG-RAN WG2 Meeting #73bis, Shanghai, China, Apr. 11-15, 2011, 5 pages.
3rd Generation Partnership Project; Technical Specification Group Radio Access Network; Evolved Universal Terrestrial Radio Access (E-UTRA); Physical layer procedures (Release 10), DRAFT3GPP TS 36.213 Va.1.0, (Mar. 2011), Mar. 24, 2011, 114 pages.
LG Electronics, "Remaining Details on Transmission Mode 9", 3GPP TSG RAN WG1 Meeting #63, Oct. 15-19, 2010, 5 pages, R1-106322.
Nokia et al., "Remaining details of transmission mode 9 control signaling", 3GPP TSG-RAN WG1 Meeting #63, Nov. 15-19, 2010, 4 pages, R1-106206.
Office Action dated Mar. 28, 2018 in connection with Korean Patent Application No. 10-2012-0035969.
European Search Report dated Jan. 22, 2018 in connection with European Patent Application No. 17 19 8131.
Korean Intellectual Property Office Office Action regarding Application No. 10-2012-0037390, dated Jun. 15, 2018, 7 pages.
Korean Intellectual Property Office Decision on Patent regarding Application No. 10-2012-0037355, dated Jun. 21, 2018, 4 pages.
Korean Intellectual Property Office Office Action regarding Application No. 10-2018-0084120, dated Aug. 10, 2018, 9 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.1.0, Mar. 2011, 53 pages.
Pantech, "Discussion on ICO handover", 3GPP TSG-RAN WG2 Meeting #73bis, R2-112268, Apr. 2011, 2 pages.
Korean Intellectual Property Office, "Office Action," Application No. KR 10-2018-0113089, dated Sep. 27, 2018, 7 pages.
Korean Intellectual Property Office, "Decision of Patent," Application No. KR 10-2012-0036220, dated Nov. 9, 2018, 4 pages.
Korean Intellectual Property Office, "Decision of Patent," Application No. KR 10-2012-0037390, dated Dec. 12, 2018, 5 pages.
Korean Intellectual Property Office, "Office Action," Application No. KR 10-2018-0084120, dated Apr. 1, 2019, 10 pages.
European Patent Office, "European Search Report," Application No. EP 19160842.1, dated Mar. 27, 2019, 11 pages.
Samsung, "Enhancement of FDM solution scope for in-device coexistence," R2-110409, 3GPP TSG-RAN WG2 #72bis, Dublin, Ireland, Jan. 17-21, 2011, 2 pages.
Rapporteur of email discussion (Nokia Corporation), "ANR email discussion report," R2-083000, 3GPP TSG-RAN WG2 RRC Adhoc, Sophia Antipolis, France, Jun. 5-6, 2008, 165 pages.
Intellectual Property India, Examination report under sections 12 & 13 of the Patents Act, 1970 and the Patents Rules, 2003, Application No. IN 2867/KOLNP/2013, dated Sep. 16, 2019, 6 pages.
Intellectual Property India, Examination report under sections 12 & 13 of the Patents Act, 1970 and the Patents Rules, 2003, Application No. IN 2866/KOLNP/2013, dated Jul. 17, 2019, 6 pages.
Korean Intellectual Property Office, Decision of Patent, Application No. KR 10-2018-0084120, dated Sep. 26, 2019, 4 pages.
3GPP TS 25.367 V10.0.0 (Mar. 2011), Technical Specification, 3rd Generation Partnership Project; Technical Specification Group Radio Access Network; Mobility procedures for Home Node B (HNB); Overall description; Stage 2 (Release 10), Mar. 2011, 14 pages.
Nokia, et al., "E-UTRA Cell Selection and Cell Reselection Aspects," R2-074051, 3GPP TSG-RAN WG2 Meeting #59bis, Shanghai, China, Oct. 8-12, 2007, 12 pages.

\* cited by examiner

US 10,887,942 B2

METHOD AND APPARATUS FOR TRANSMITTING/RECEIVING DATA IN MOBILE COMMUNICATION SYSTEM

CROSS REFERENCE TO RELATED APPLICATIONS

This application is a continuation of application Ser. No. 15/483,979, filed Apr. 10, 2017, which is a continuation of application Ser. No. 14/111,530, which is the National Stage of International Application No. PCT/KR2012/002726, filed Apr. 10, 2012, now U.S. Pat. No. 9,622,164, which claims the benefit of Provisional Application No. 61/473,966, filed Apr. 11, 2011, this disclosures of which are incorporated herein by reference into the present disclosure as if fully set forth herein.

BACKGROUND

1. Field

The present disclosure relates to a method and apparatus for transmitting/receiving data in a mobile communication system.

2. Description of Related Art

The mobile communication system has been developed for the user to communicate on the move. With the rapid advance of technologies, the mobile communication system has evolved to the level capable of providing high speed data communication service as well as voice telephony service.

Recently, as one of the next generation mobile communication system, Long Term Evolution (LTE) is on the standardization by the 3$^{rd}$ Generation Partnership Project (3GPP). LTE is a technology designed to provide high speed packet-based communication at a data rate of up to 100 Mbps and aims at commercial deployment around 2010 timeframe.

With the commercialization of various packet services, it is frequent that small size packets occur sporadically. In the general mobile communication systems including LTE, it is inevitable to establish a signaling connection and data bearer to transmit a packet even when the packet is so small. This causes frequent control data exchange and, if a plurality of terminals try to establish connections for small size data transmission, this causes significant network overload and degrades battery performances of the terminals.

SUMMARY

The present disclosure has been proposed to solve to above problem and aims to provide a method and apparatus for processing small and sporadically-occurring packets efficiently.

In accordance with an aspect of the present disclosure, a data transmission method of a terminal includes determining, when a data to be transmitted occurs, whether a short data transfer condition is fulfilled and transmitting, when the short data transfer condition is fulfilled, a Radio Resource Control (RRC) setup complete message including the data.

In accordance with another aspect of the present disclosure, a terminal for transmitting data includes a controller which determines, when a data to be transmitted occurs, whether a short data transfer condition is fulfilled and a transceiver which transmits, when the short data transfer condition is fulfilled, a Radio Resource Control (RRC) setup complete message including the data.

The data transmission/reception method of the present disclosure provides an apparatus and method for transmitting/receiving data in a mobile communication system that is capable of processing small and sporadically-occurring packets efficiently to reduce network overload and improve battery performance of the terminal.

DETAILED DESCRIPTION

Detailed description of well-known functions and structures incorporated herein may be omitted to avoid obscuring the subject matter of the present invention. Exemplary embodiments of the present invention are described with reference to the accompanying drawings in detail.

The present disclosure relates to a method and apparatus for processing data small in size and occurring sporadically. Prior to explaining the present invention, brief description is made of the LTE system and carrier aggregation.

Figure 1:
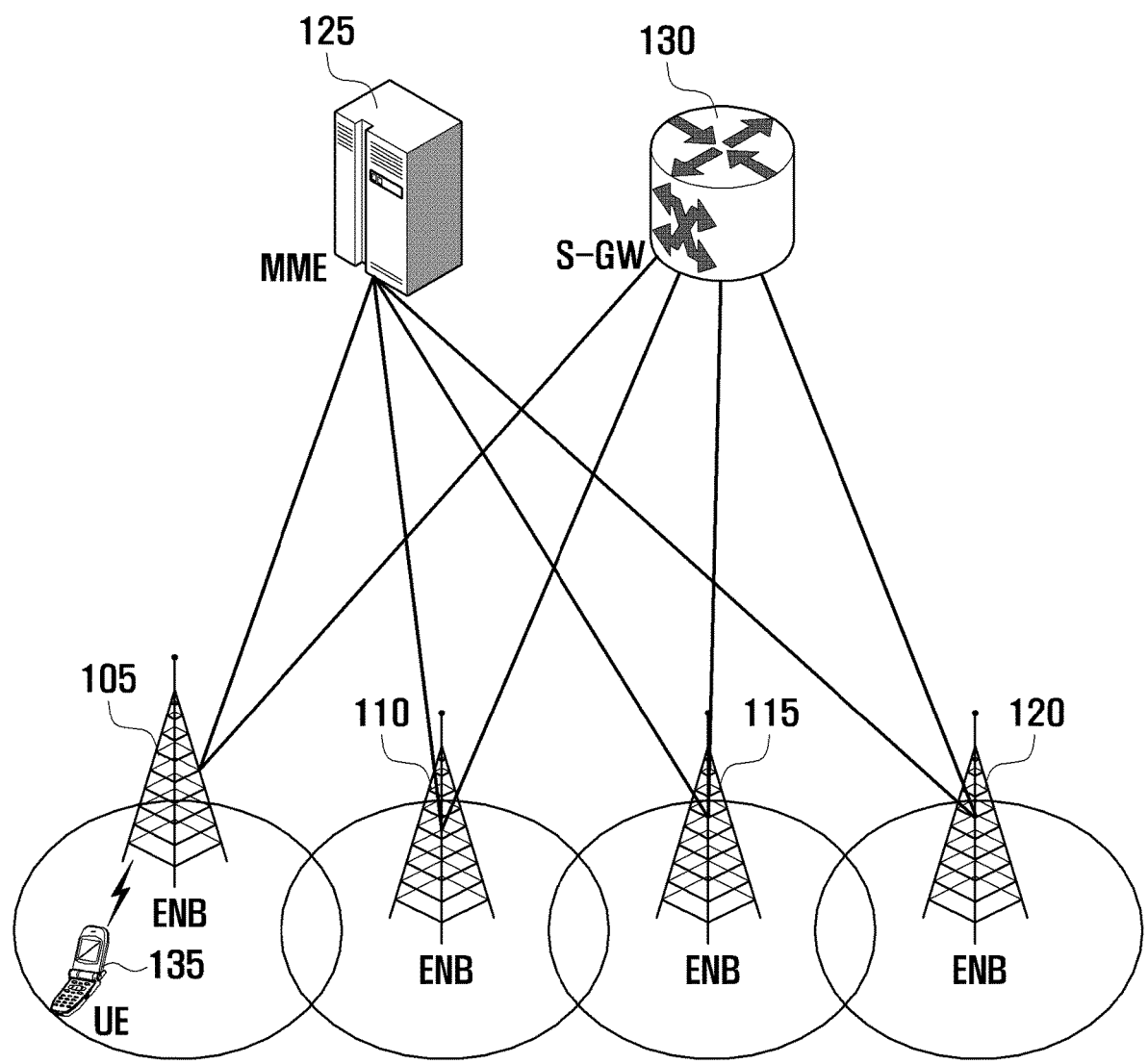
FIG. 1 is a diagram illustrating network architecture of an LTE system to which the present disclosure is applied.

FIG. 1 is a diagram illustrating network architecture of an LTE system to which the present disclosure is applied.

As shown in FIG. 1, the radio access network of the LTE system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105, 110, 115, and 120 correspond to the legacy node B of UMTS system. The eNB 105 establishes a radio channel with the UE 135 and is responsible for complex functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
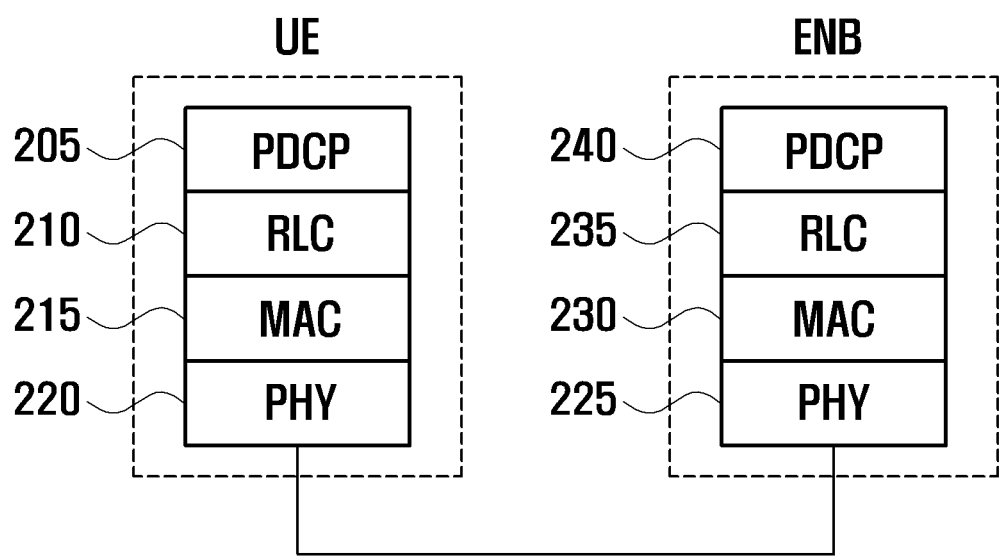
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, ciphering, and Integrity Protection, and the RRC 210 and 235 is responsible for reconstructing the PDCP Protocol Data Unit (PDU) into appropriate size. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
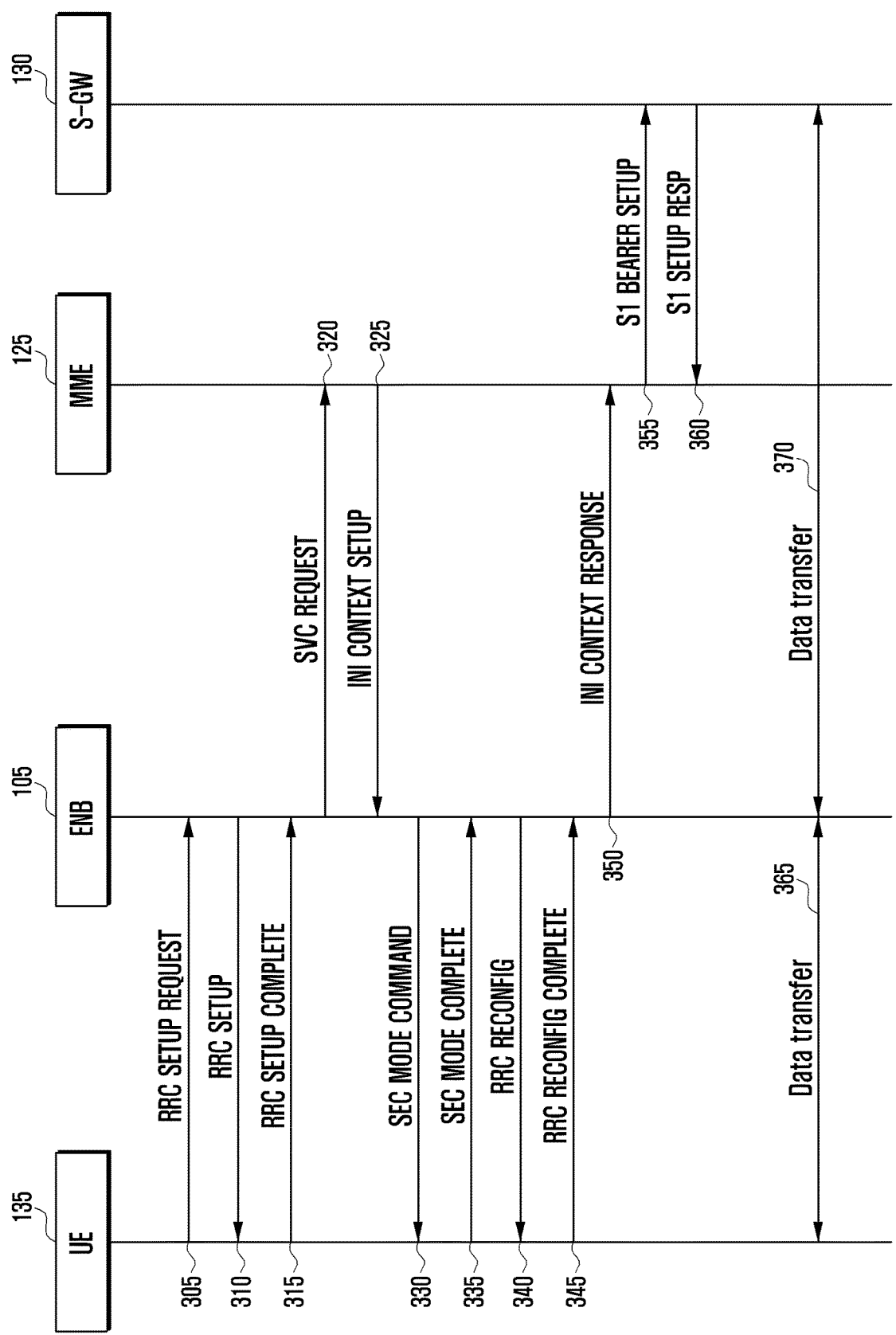
FIG. 3 is a diagram illustrating a procedure for UE 135 to establish a connection to a network for data communication.
Figure 4:
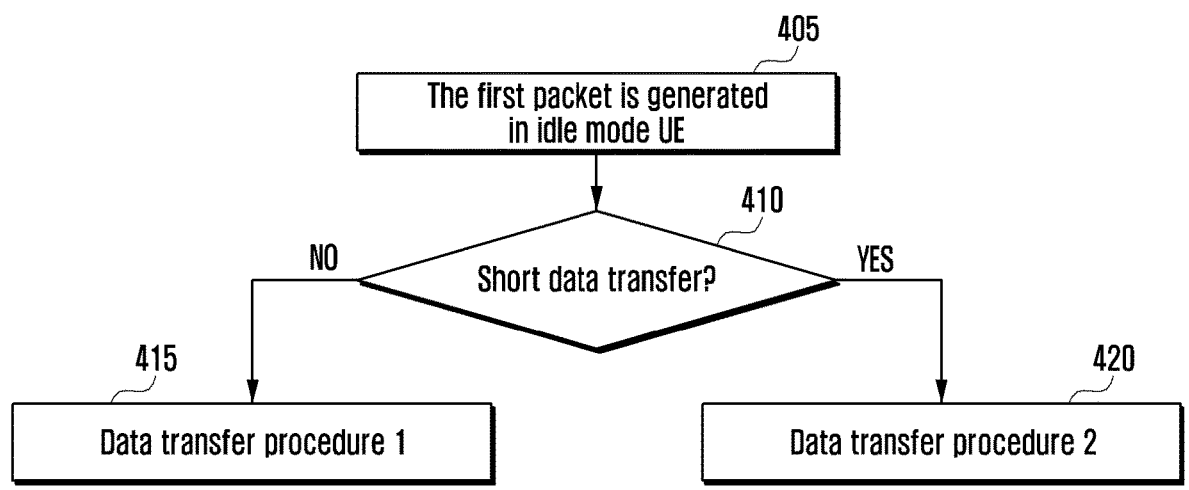
FIG. 4 is a diagram illustrating embodiment 1 of the present disclosure.

FIG. 3 is a diagram illustrating a procedure for UE 135 to establish a connection to a network for data communication.

If data occurs at the UE 135 in idle mode, the UE 130 performs RRC CONNECTION ESTABLISHMENT procedure with the eNB 105. The UE 135 acquires uplink transmission synchronization with the eNB 105 through a random access procedure and sends the eNB 105 an RRC CONNECTION REQUEST message at operation 305. This message includes the identifier of the UE 135 and the reason for connection establishment. The eNB 105 sends the UE 135 an RRC CONNECTION SETUP message for establishing the RRC connection at operation 310. This message includes RRC connection configuration information. The RRC connection is also called Signaling Radio Bearer (SRB) and used for exchanging RRC messages as control messages between the UE 135 and the eNB 105.

After the RRC connection establishment, the UE 135 sends the eNB 105 an RRC CONNECTION SETUP COMPLETE message at operation 315. This message includes a SERVICE REQUEST message requesting the MME 125 for bear setup for a certain service. The eNB 105 sends the MME the SERVICE REQUEST message included in the RRC CONNECTION SETUP COMPLETE message at operation 320, and the MME 125 determines whether to provide the service requested by the UE 135. If it is determined to provide the service requested by the UE 135, the MME 125 sends the eNB 105 an INITIAL CONTEXT SETUP REQUEST message at operation 325. This message includes QoS information to be applied Data Radio Bearer (DRB) establishment, security information to be applied to DRB (e.g. security key), Security Algorithm, etc.

The eNB 105 sends the UE 135 a SECURITY MODE COMMAND message at operation 330 and receives a SECURITY MODE COMPLETE message from the UE 135 at operation 335 to configure security. If the security configuration has completed, the eNB 105 sends the UE 135 an RRC CONNECTION RECONFIGURATION message at operation 340. This message includes the configuration information on the DRB for processing user data, and the UE 135 configures DRB based on this information and sends the eNB 105 an RRC CONNECTION RECONFIGURATION COMPLETE message at operation 345.

Once the DRB configuration with the UE 135 has completed, the eNB 105 sends the MME 125 an INITIAL CONTEXT SETUP COMPLETE message at operation 350 and, upon receipt of this message, the MME 125 transmits an S1 BEARER SETUP message to the S-GW 130 and receives an S1 BEARER SETUP RESPONSE message from the S-GW 130. The S1 BEARER is the connection for data transmission which is established between the S-GW 130 and the eNB 105 and mapped to the DRB 1 by 1. Once the above procedure has completed, the UE 135 starts data communication via the eNB 105 and the S-GW 130 at operations 365 and 370.

Basically, the UE 135 and the network maintain two types of security configurations. Assuming that the security between the UE 135 and the MME 125 is security 1 and the security between the UE 135 and the UE 105 is security 2, the securities are characterized as follows.

Security 1: This is the security provided for the control message between the UE 135 and the MME 125 (hereinafter, the control message between the UE and the MME 125 is referred to as NAS message) based on a predetermined security key, security algorithm, and COUNT. The security 1 is maintained even when the UE 135 which has initially connected the network already enters the idle mode. The security 1 provides integrity protection and ciphering. The integrity protection is applied to all NAS messages with the exception of the initial connection message, and the ciphering is applied after the first DRB establishment to the UE 135. The UE 135 transmits the service request message including the information indicating the security key applied, and the MME 125 performs integrity check using the above information and a sequence number of the service request. If the integrity check is verified, subsequent NAS messages are ciphered. The COUNT is a variable increasing monotonically by packet and derived from NAS sequence number. Hereinafter, the variable COUNT of security 1 is referred to as COUNT1.

Security 2: This is the security provided for data exchange between the UE 135 and the eNB 105 using other security key, security algorithm, and COUNT. The security 2 is applied after the UE establishes the RRC connection and exchanges security mode command/complete messages with the eNB 105 and performed by PDCP layer. The security key and algorithm information are determined in the security mode configuration procedure. The COUNT is a variable increasing monotonically by packet and derived from the PDCP sequence number. Hereinafter, the variable COUNT of security 2 is referred to as COUNT2.

The procedure of FIG. 3 may be divided into three processes of RRC connection establishment (305, 310 and 315), security 2 configuration (330 and 335), and DRB configuration (340 and 345). Such processes may be performed with no problems in the normal data transmission but, if a few small size packets are transmitted after establishing connection, performing all of the processes increases signaling overhead significantly.

In order to solve the above problem, the present disclosure defines a new data transmission procedure appropriate for small size sporadic packet transmission (hereinafter, referred to as short data transfer procedure).

If new data occurs in the idle mode UE (UE with no RRC connection at operation 405, the UE 135 determines whether the new data fulfills the short data transfer condition at operation 410 and performs, if the data does not fulfills the condition (i.e. if the legacy data transfer procedure is preferable), performs the data transfer procedure 1 at operation 415 and, otherwise the short data transfer procedure is preferable, the data transfer procedure 2 at operation 420.

The data transfer procedure 1 denotes the procedure depicted in FIG. 3. The data transfer procedure 2 is characterized as follows and described with reference to FIG. 5.

Apply security 1
transmit IP packet using SRB and control connection
There may be short data transfer use conditions as follows.

[short data transfer procedure-invoke condition 1]
Data occur on predetermined EPS bearer (or predetermined service) of RRC idle and ECM-IDLE terminal 135. The EPS bearer is selected by the network in the EPS bearer setup procedure between the eNB 135 and the network and notified to the eNB 135. For example, the EPS bearer for the instant messaging service may be configured to invoke the short data transfer procedure.

[short data transfer procedure-invoke condition 2]
A packet smaller than a predetermined threshold value occurs in the RRC idle and ECM-IDLE UE 135. The packet size is the size before the PDCP/RLC/MAC header is added.

[short data transfer procedure-invoke condition 3]
A packet occurs on a certain EPS bearer of the RRC idle and ECM-IDLE UE 135, and a number of packets occurred on the EPS bearer in a predetermined recent time duration is equal to or less than a predetermined value. For example, if a new packet occurs on the EPS bearer of the RRC idle and ECM-IDLE UE 135 on which the total downlink and uplink packets occurred within recent 10 minutes is equal to or less than 5, this invokes the short data transfer procedure.

A packet occurs in the RRC idle and ECM-IDLE UE 135, and a number of packets occurred in the UE 135 within a predetermined recent time duration is equal to or less than a predetermined value. For example, if a packet occurs in the RRC idle and ECM-IDLE UE 135 in which the total downlink and uplink packets occurred within recent 10 minutes is equal to or less than 5, this invokes the short data transfer procedure.

[short data transfer procedure-invoke condition 4]
A packet occurs on a certain EPS bearer of the RRC idle and ECM-IDLE UE 135 and a number of packets occurred in the most recent RRC connection state or most recent active state on the EPS bearer is equal to or less than a predetermined value.

A description is made of ECM-IDLE state hereinafter.
ECM-IDLE State

When there is not NAS signaling connection between the UE and the network, the UE is in the ECM-IDLE state. The MME 125 stores UE context such as security context and allowed QoS profile. In the ECM-IDLE state, the UE performs cell selection/reselection and Public Land Mobile Network (PLMN). The UE context for the UE in ECM-IDLE state does not exist in E-UTRAN. There is no S1_MME and S1_U connection for the UE in the ECM-IDLE state. If the current Tracking Area (TA) does not exists in the TA list received from the network, the UE has to update TA to maintain registration, allow the MME 125 to page the UE, and perform service request procedure to reply in response to the paging from the MME 125 and has to perform service request procedure for establishing radio bearers in transmitting uplink user data.

A description is made of RRC idle state hereinafter.
If a RRC connection is established, the UE is in the RRC_CONNECTED state. In other case, i.e. if not RRC connection is established, the UE is in the RRC_IDLE state. The UE applies UE-controlled mobility, monitors paging to detect incoming call and change in system information, performs neighbor cell measurement and cell (re)selection, and acquire system information.

A description is made of the EPS bearer hereinafter.
The EPS bearer is single level for controlling bearer level QoS control in the EPC/E-UTRAN. That is, all the traffics mapped to the same EPS are received with the same bearer level packet forwarding process (e.g. scheduling policy, queue management policy, rate shaping policy, and RLC configuration). Providing other bearer level packet forwarding policies require separate EPS bearers.

Each EPS bearer (GBR and Non-GBR) is associated with the following bearer level QoS parameters.

QoS Class Identifier (QCI);
Allocation and Retention Priority (ARP).

QCI is a scalar quantity used as a reference value for accessing node-specific parameters controlling bearer level packet forwarding process (scheduling weights, admission thresholds, queue management threshold value, link layer protocol configuration, etc.) and preconfigured by the operator of the access node such as eNB.

ARP has to include information on the priority level (scalar), preemption capability flag, and preemption vulnerability flag. The main purpose of the ARP is to determine whether to accept or reject the bearer establishment/reconfiguration request depending on the resource restriction.

Figure 5:
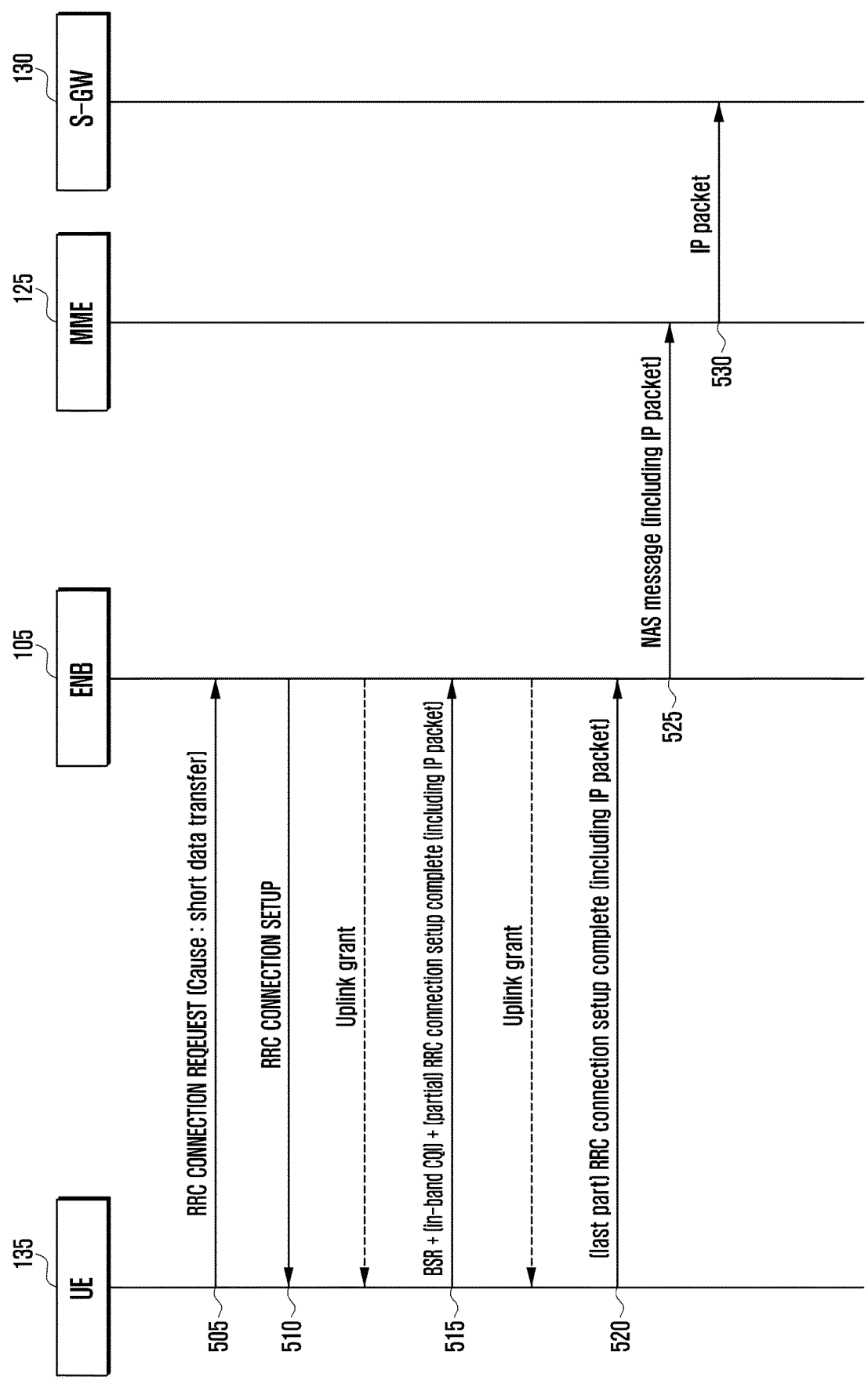
FIG. 5 is a flowchart illustrating the data transfer procedure.

FIG. 5 is a flowchart illustrating the data transfer procedure 2.

A short data occurs in the UE 105 at operation 505. The RRC of the UE 105 initiates the RRC Connection Setup procedure with a 'short data transfer' reason value. An indicator indicating that the 'short data transfer' procedure is required may be included in the RRC connection setup complete message at operation 515. It is not that all the data depends on the data transfer procedure 2. The data transfer procedure 2 is applied to only the predetermined EPS bearer (or when a predefined condition is fulfilled). Whether the EPS bearer is established for 'short data transfer' is configured in the EPS The eNB 150 sends an RRC connection setup message at operation 510. The RRC connection setup message includes SRB 1 establishment information. The eNB 105 transmits an uplink grant for the UE 135 after the SRB1 setup. Then the UE 135 may not initiate the random access procedure to request for uplink grant for transmitting the RRC connection setup complete message for a predetermined duration.

The UE 135 sends the RRC connection setup complete message including IP packet with a container (referred to as dedicatedNASInfo) for MME 125 at operation 515. The RRC connection setup complete message may be carrier by a plurality of MAC PDUs. The first MAC PDU may include the MAC CE carrying the Buffer Status Report (BSR) and Channel Quality Information (CQI). The CQI may include the following information.

CQI: CQI of the current cell. This information is derived from the received RSRP or RSRQ. This is mainly used for downlink scheduling.

Pathloss: pathloss of current cell's reference signal. This information is derived from the downlink transmit power of the reference signal and RSRP. The downlink transmit power of the reference channel may be provided in the system information. Since the eNB 105 knows the downlink transmit power already, it may calculate the path loss with the RSRP other than pathloss.

Power headroom: information on the difference between the nominal maximum UE output power and the power estimated for UL-SCH (i.e. MAC PDU) transmission.

If the RRC connection setup complete message is received successfully, the eNB 105 sends the MME 125 the dedicatedNASInfo included in the RRC connection setup complete message at operation 520.

The MME 125 deciphers the dedicatedNASInfo, de-multiplexes the IP packet, and sends the S-GW 130 the IP packet at operation 525. The S-GW 130 transmits the IP packet to the destination node based on the routing information included in the IP packet.

According to this embodiment, if the data transfer procedure 2 is used, the security 1 is applied even to the IP packet. That is, if the IP packet is transmitted in the data transfer procedure 1, the security 2 is applied thereto and, otherwise if the IP packet is transmitted in the data transfer procedure 2, the security 1 is applied thereto.

As described above, the security 1 is used for providing security for the NAS control message between the UE 135 and the eNB 105. In the case of the short data, however, the security 1 is applied to the IP packet according to the present disclosure. In the normal security 1, the UE 135 sends the MME 125 a service request message and, after a DRB is established in response thereto, ciphering is applied to the NAS message. In the present disclosure, it is necessary to apply ciphering without establishment of any DRB and thus it is impossible to follow the above procedure as it is. In the present disclosure, the application of ciphering starts from the NAS control message included in the RRC connection setup complete message.

Figure 6:
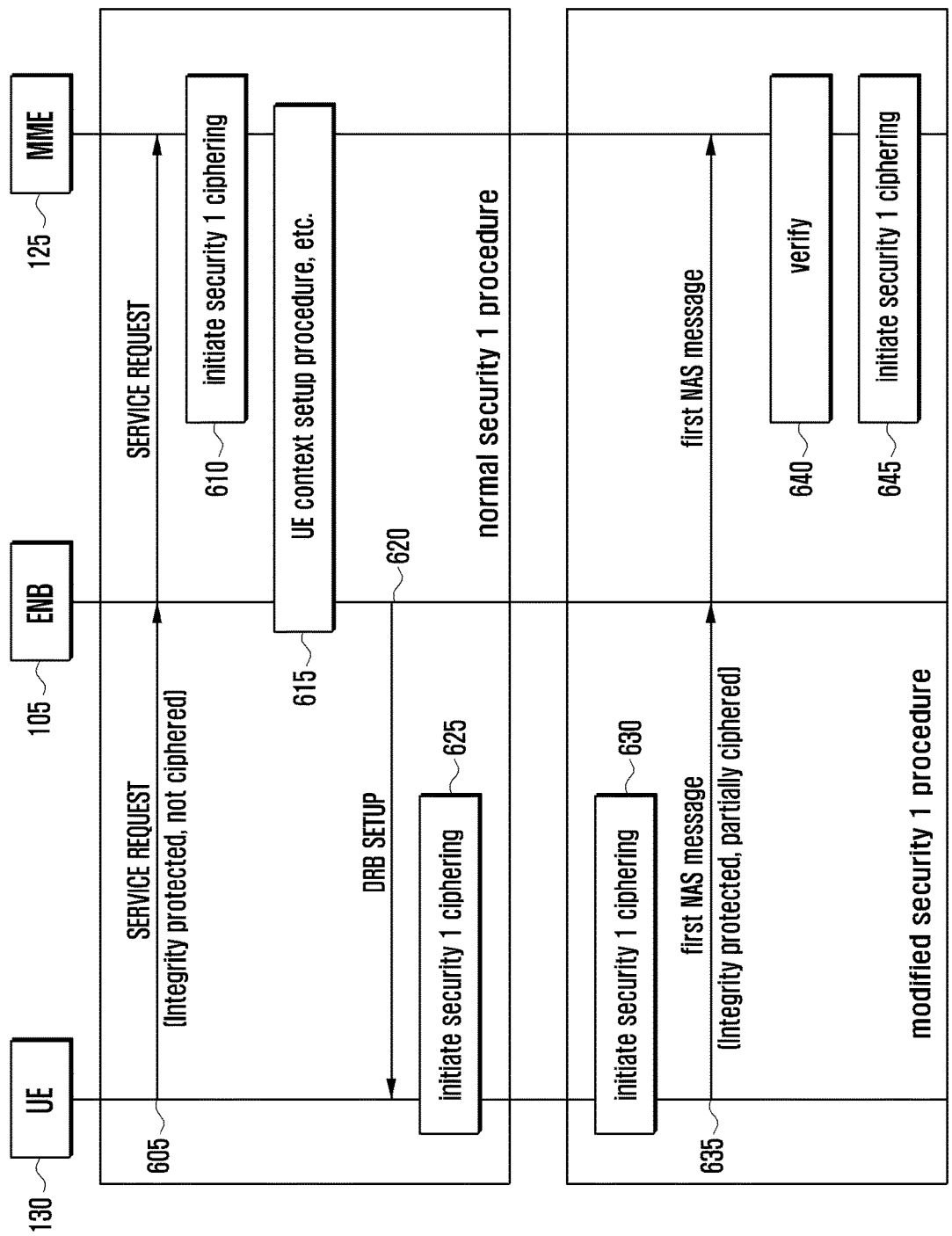
FIG. 6 is a diagram illustrating the normal security 1 process and the modified security 1 process.

FIG. 6 is a diagram illustrating the normal security 1 process (operations 605 to 625) and the security 1 process for data transfer procedure 2 (operations 630 to 645). Operations 630 to 645 are the process performed in separation from operations 605 to 625 other than following operations 605 to 625. If the data transfer procedure 2 is used currently for NAS control message transmission, the UE applies a modified security 1 process and, otherwise if the data transfer procedure 2 is not used, applies the normal security 1 process. For example, in the security 1 process, the UE 135 applies the integrity protection but not ciphering in transmitting the service request message as the first control message to transition to the EMM-CONNECTED state at operation 605. The service request message includes Key Set Identifier (KSI) as the information for identifying the security key used in the security 1. Upon receipt of the above message, the MME 125 performs verification by referencing the Message Authentication Code (MAC) included in the message. If the message is verified, the MME 125 activates the ciphering function of the security 1 and performs the UE context configuration procedure with the eNB 105 at operation 615. If the ciphering function of the security 1 is activated, this means that ciphering is applied to the NAS message to be transmitted and deciphering is applied to the NAS message received since then.

If the entire procedure for establishing the DRB with the UE 135 has completed, the eNB 150 sends the UE 135 a control message for commanding DRB configuration at operation 620. If the DRB is established initially, the UE 135 activates the ciphering function of the security 1 at operation 625.

In the modified security 1 process, the UE 135 activates the ciphering function of the security 1 before transmitting the first control message for transitioning to the EMM-CONNECTED state at operation 630. That is, ciphering is applied to the first control message along with the integrity protection. The UE 135 sends the MME 125 the partially-ciphered first control message at operation 635, the MME 125, upon receipt of the control message, checks the MAC-I of the control message to verify the control message at operation 640, and activates, if the message is verified, the ciphering function of the security 1 to perform deciphering on a predetermined part of the control message at operation 645.

Figure 7:
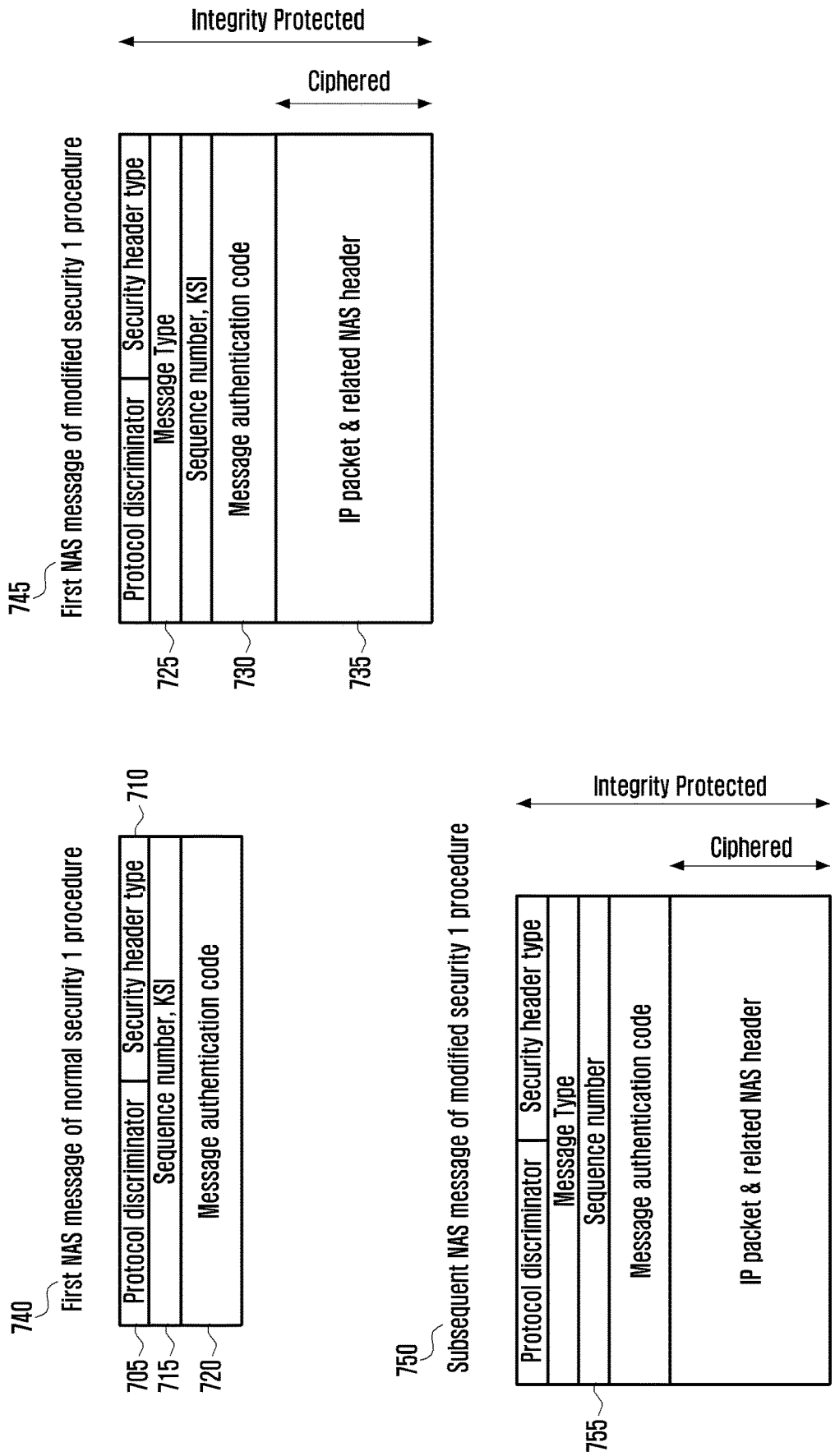
FIG. 7 is a diagram illustrating message formats of embodiment 1 of the present disclosure.

FIG. 7 is a diagram illustrating messages for use in transitioning to the EMM-CONNECTED state. The first control message of the normal security 1 procedure for transitioning to the EMM-CONNECTED state and the first control message and subsequent message of the modified security 1 process for transitioning to the EMM-CONNECTED state are depicted in FIG. 7. The normal security 1 process is used in the data transfer procedure 1 and the modified security 1 process is used in the data transfer procedure 2.

In the case of using the normal security 1 process, the first NAS message 740 may be the service request message. The NAS message includes the normal control information such as protocol discriminator 705 and Security Header type 710. The protocol discriminator 705 is the information indicating the L3 protocol of the corresponding control message, and the security header type 710 indicates whether the integrity protection and/or ciphering is applied to the corresponding message.

The message 740 is protected by the integrity protection but not ciphered. This means that the MAC 720 is applied to the corresponding message and its value is included in the message. The integrity protection is described in detail as follows. The sender device calculates MAC by inputting the message 815 to which predetermined Key 825, predetermined variables, and integrity protection to a predetermined device. The predetermined variables include COUNT 805, DIRECTION 810, BEARER 820, etc. The COUNT is a variable derived from the NAS sequence number, the DIRECTION is a variable determined depending on uplink/downlink, and the BEARER is a predetermined value. A description is made of the COUNT in more detail hereinafter.

COUNT=0x00∥NAS OVERFLOW∥NAS SQN

When the 8 most left bits are all zero padding bits, the NAS OVERFLOW is 16-bit value increasing at every time when the NAS SQN increases from maximum value, and NAS SQN is a 8-bit sequence number included each NAS message.

It is noted that the NAS sequence number is 5 bits other than 8 bits in the messages 740 and 745. This is to transmit both the KSI and NAS sequence number in 1 byte.

If a certain message is received, the receiver device calculates MAC by applying the same algorithm, variables, and key to the message. If the calculated MAC and the received MAC match, it is determined that the corresponding message is verified.

In the data transfer procedure 2, the first message 745 for transitioning to the EMM-connected state is protected entirely with the integrity protection and ciphered partially. Unlike the message 740, the message 745 includes the information 725 for identifying the type of the corresponding message. This information is used for discriminating between the messages 740 and 745 sharing the characteristic as the first message for transitioning to the ECM-CONNECTED state.

Figure 8:
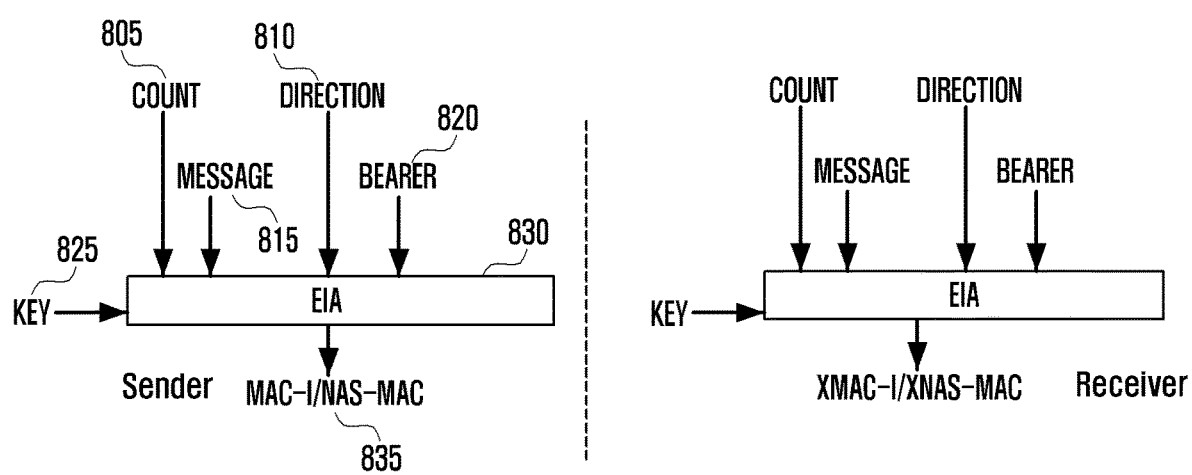
FIG. 8 is a diagram illustrating integrity protection.

FIG. 8 is a diagram illustrating algorithm of calculating Message Authentication Code (MAC). The MAC 730 is of being calculated for the entire message 745 or for a part remained after excluding the header information related to the IP packet in the message 745. In more detail, the MAC 730 may be a value calculated with the input of a part excluding the IP packet and related NAS header 735 and MAC 730 from the message 745 to the message 815 or a value calculated by inputting a part excluding the MAC 730 from the message 745 to the message 815. The IP packet and related NAS header 735 is the concatenation of the IP packet to be transmitted by the UE 135 and the header of the NAS level accompanied with the packet. The header of the NAS level may include the information indicating that the payload contains IP packets.

Figure 9:
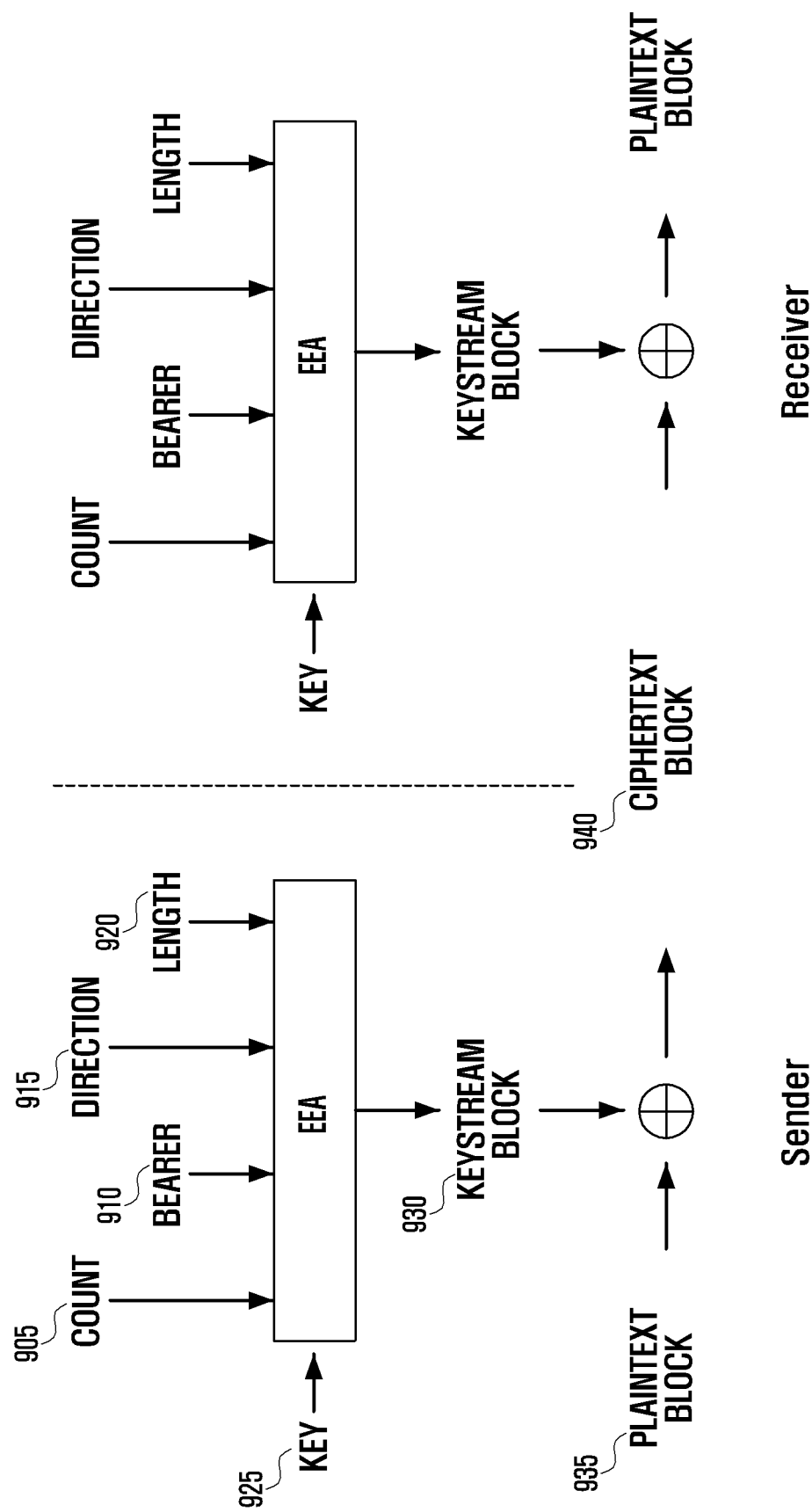
FIG. 9 is a diagram illustrating ciphering/deciphering.

FIG. 9 is a diagram illustrating the ciphering. The UE 135 applies ciphering to the IP packet and related NAS header 735 part but the other part in the message 745. The ciphering is completed by applying a predetermined operation (e.g. exclusive OR) to the KEYSTREAM BLOCK having the same length as the bit stream (PLAINTEXT 935) to which the ciphering is applied. The KEYSTREAM BLOCK 930 is generated with a predetermined key, a predetermined algorithm, and predetermined variables including COUNT 905, BEARER 910, DIRECTION 915, and LENGTH 920. The LENGTH is a variable indicating the length of the PLAINTEXT 935/KEYSTREAM BLOCK 920. The deciphering is completed by applying a predetermined operation to the KEYSTREAM BLOCK 930 and CIPHERTEXT BLOCK 940 generated with the same key, same algorithm, and same variables as the ciphering.

When ciphering a part of the message 745, the UE 135 inputs the IP packet and related NAS header 735 as the PLAINTEXT BLOCK 935, the length of the IP packet and the related NAS header 735 as the LENGTH 920, and a value related to the sequence number of the message 745 as the COUNT, and uses the key derived from KSI as the ciphering key.

When deciphering the message 745, the MME 125 inputs the IP packet of the received message 745 and the related NAS header 735 as the CIPHERTEXT BLOCK 940 and a value related to the sequence number of the message 745 as the COUNT and uses the key derived from the KSI as the deciphering key.

The subsequent message 750 after transitioning to the EMM-connected state is identical with the message 745 with the exception that the KSI is not transmitted and 8-bit sequence number is used.

It is noted that the UE 135 and the MME 125 perform the integrity protection after applying the ciphering. That is, the UE 135 calculates the MAC by inputting the ciphered IP packet and related NAS header 735 as a part of the message, and the MME 125 calculates the MAC by inputting the IP packet and related NAS header 735 as the part of the message too and, if the message is verified, performs deciphering on the IP packet and related NAS header 735. This is to perform the subsequent operation using the information contained in the reliable message passed the integrity check.

In the case of applying the data transfer procedure 1, security is applied to on PDCP, or the message 750 is processed, the ciphering is performed after applying the integrity protection. This is because since the integrity check has been performed at the previous operation already there is no need of verifying the reliability in unit of message at the sender device and the receiver device.

Figure 10:
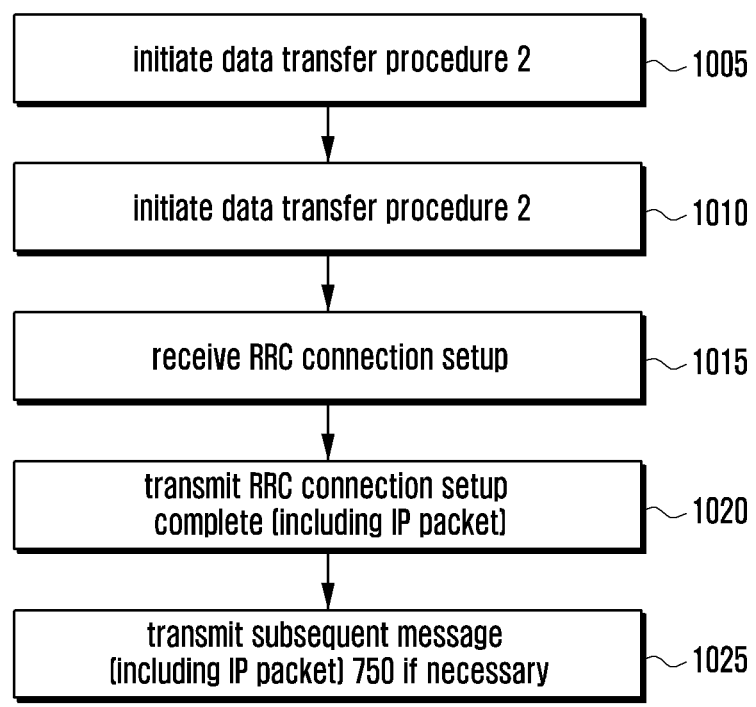
FIG. 10 is a drawing illustrating UE device operation of embodiment 1.

FIG. 10 is a flowchart illustrating the operations of the UE 135.

If the aforementioned short data transfer procedure invoke condition is fulfilled, the UE 135 starts the data transfer procedure 2 at operation 1005.

The UE 135 transmits an RRC connection request message in the random access procedure at operation 1010. This message includes the reason of the RRC connection setup procedure. The UE may inform that the message is for the short data transfer procedure. The short data transfer procedure requirement may be indicated in the RRC connection complete message.

If the RRC connection setup message is received at operation 1015, the UE 135 performs the following operations.

The UE 135 establishes an SRB 1 according to the information received in the RRC connection setup message.

The UE 135 notifies the higher layer of the capability of the short data transfer (manages EPS bearer data transfer). Then the EPS bearer management entity sends the IP packet to the NAS layer.

The NAS layer generates a message 745 by concatenating the message type field, IP packet, and others. The NAS layer ciphers the IP packet and related NAS header 735 part with the current NAS security key and other variables. The NAS layer calculates the MAC based on the current security key and other variables. In normal case, it has to be noticed that the NAS ciphering is performed after the first message is transmitted successfully.

The NAS layer sends the message 745 to the RRC layer.

The RRC builds the RRC connection setup complete message at operation 1020. The RRC connection setup complete message includes the following information.

Routing information for determining MME 125 to which the NAS message has to be routed (selectedPLMN-Identity, registeredMME).

dedicatedInfoNAS (message 745)

Alternatively, if the short data transfer procedure is not indicated in the RRC connection request message, the indication is included in the message.

If the RRC connection setup complete message cannot be transmitted in one MAC PDU, (i.e. if the message is segmented and transmitted across a plurality of MAC PDUs), the UE 135 includes the following information in the MAC PDU carrying the first part of the RRC connection setup complete message.

information indicating the residual size of the RRC connection setup complete message (or buffer status report).

channel state-related information. This may be the RSRP measurement result of the serving cell. This also may be the information processed based on the RSRP like CQI. The eNB 105 allocates resource for transmitting RRC connection setup complete message to the UE 135.

The UE 135 transmits the RRC connection setup complete message through the ARQ-protected SRB 1.

The UE 135 configures the message 750 for the data occurring on the same EPS bearer and sends the message to the eNB 105 at operation 1025.

Figure 11:
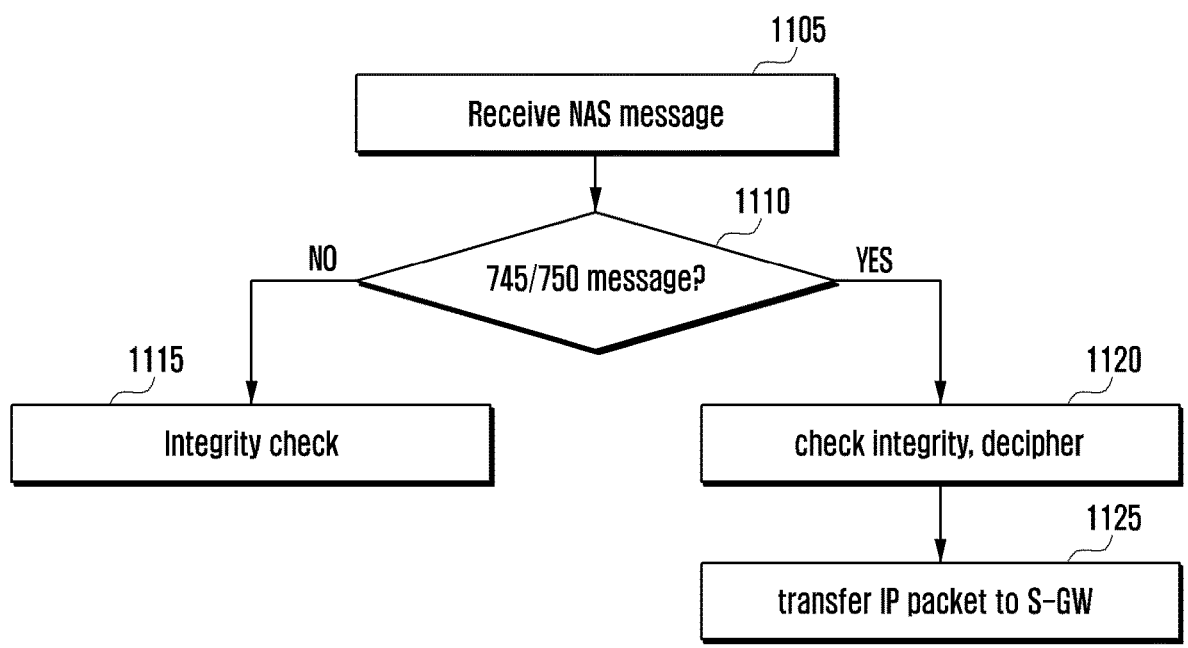
FIG. 11 is a drawing illustrating MME 125 device operation of embodiment 1.

FIG. 11 shows the operations of the MME 125.

The MME 125 receives a NAS message addressed to a certain UE 135 at operation 1105. The MME 125 checks whether the NAS message is the message 745 or the message 750 at operation 1110. If the message is the first NAS message transmitted by the UE 135 in ECM-IDLE state and if the message type filed includes the information indicating the message to which data transfer procedure 2 is applied, this message is the message 745. If the message is not the first NAS message transmitted by the UE 135 in ECM-IDLE state but if the message type field including the information indicating the message to which the data transfer procedure 2 is applied, this message is the message 750.

If the received message is neither the message 745 nor the message 750, the MME 125 performs integrity check on the received NAS message at operation 1115 and, if the integrity is verified, performs subsequent operation necessary.

If the received message is either the message 745 or the message 750, the UE 135 performs integrity check and deciphering on the received message at operation 1120 and, if the integrity check is successful, sends the IP packet included in the message to the S-GW 130 of the UE 135 at operation 1125.

In the above embodiment, it is possible to modify the operation 520 of FIG. 5 such that the UE 135 concatenates the two NAS messages for transmission. That is, the UE 135 transmits the NAS message including the normal service request message and the IP packet to the eNB 105 at operation 520, and the eNB 105 relays this message to the MME 125. If it is determined to use the data transfer procedure 2, the UE 135 generates the service request message according to the normal procedure and activates the ciphering function of the security 1 immediately unlike the normal procedure. The UE 135 generates a NAS message including the IP packet and applies ciphering to the NAS message. The NAS message including the service request message and the IP packet may be included in the RRC connection setup complete message. If the RRC connection setup complete message is received, the eNB 105 sends the MME 125 the NAS message including the service request message and the IP packet, and the MME 125 performs integrity check on the service request message and, if the integrity is verified, determines the deciphering key by referencing the KSI information. The MME 125 deciphers the NAS message including the IP packet by applying the deciphering key. The MME 125 extracts the IP packet from the NAS message and transmits the IP packet to the S-GW 130 of the UE 135.

Figure 12:
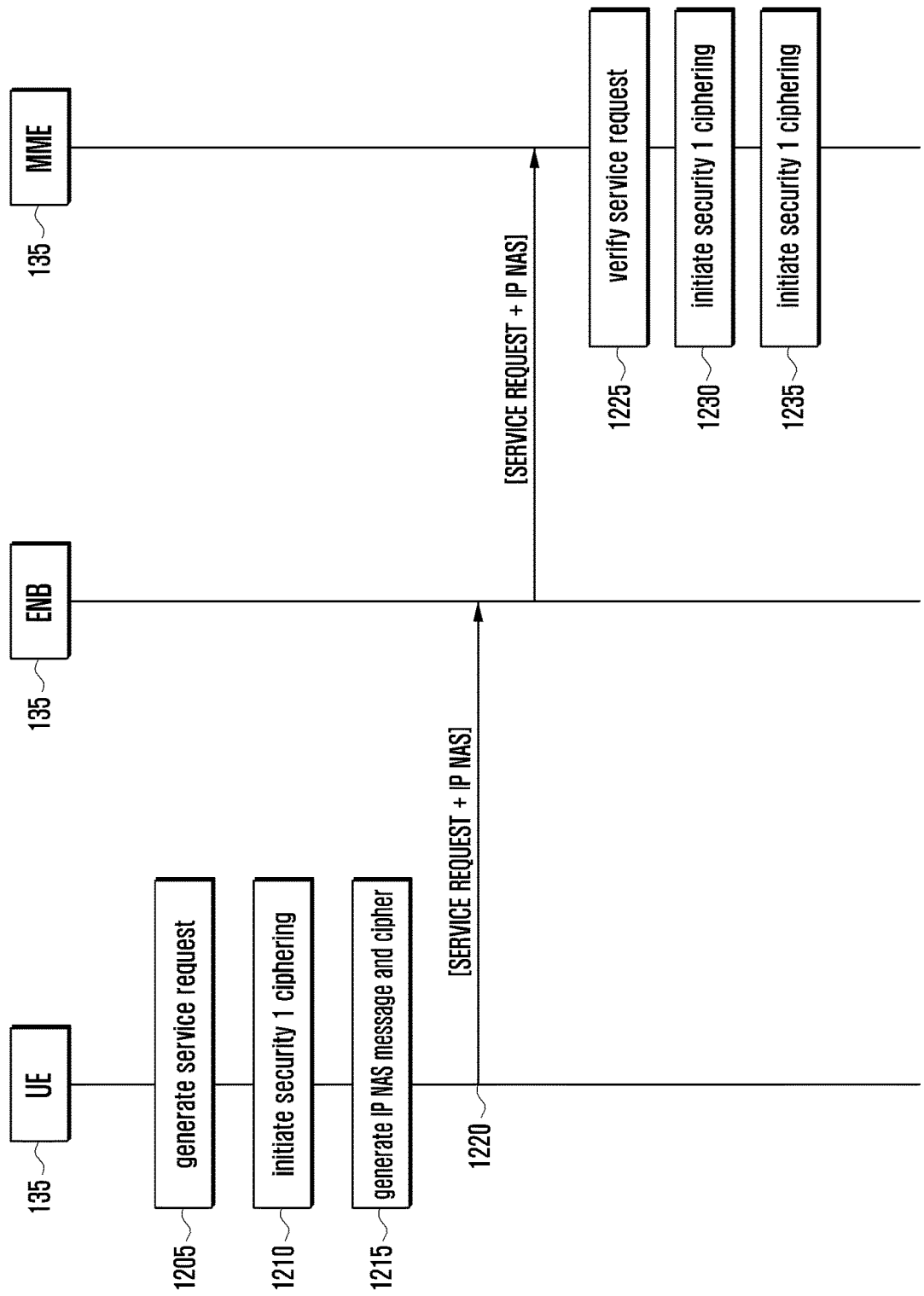
FIG. 12 is a drawing illustrating another modified security 1 procedure.

FIG. 12 is a flowchart illustrating another modified security 1 procedure-related operations.

In a modified security 1 procedure, the UE 135 generates a service request message for transitioning to the EMM-CONNECTED state at operation 1205. If the service request message is generated completely, the UE 135 activates (initiates) the ciphering function of the security 1 at operation 1210. Next, the UE 135 generates the NAS message including the IP packet (hereinafter, referred to IP NAS message) and applies ciphering to the message at operation 1215. The service request message and the IP NAS message are transmitted to the MME 125 at operation 1220, and the MME 125 performs integrity check on the service request message at operation 1225 and, if the message is verified, activates the ciphering function at operation 1230. The MME 125 performs deciphering on the IP NAS message received along with the service request message at operation 1235. The service request message may differ from the normal service request message and, herein, is referred to as service request type 2 message. If the service request message is received, the MME 125 performs the procedure for DRB setup and, otherwise if the service request type 2 message is received, does not perform the procedure. The service request type 2 message format has an extra message type field as compared to the normal service request message.

Figure 13:
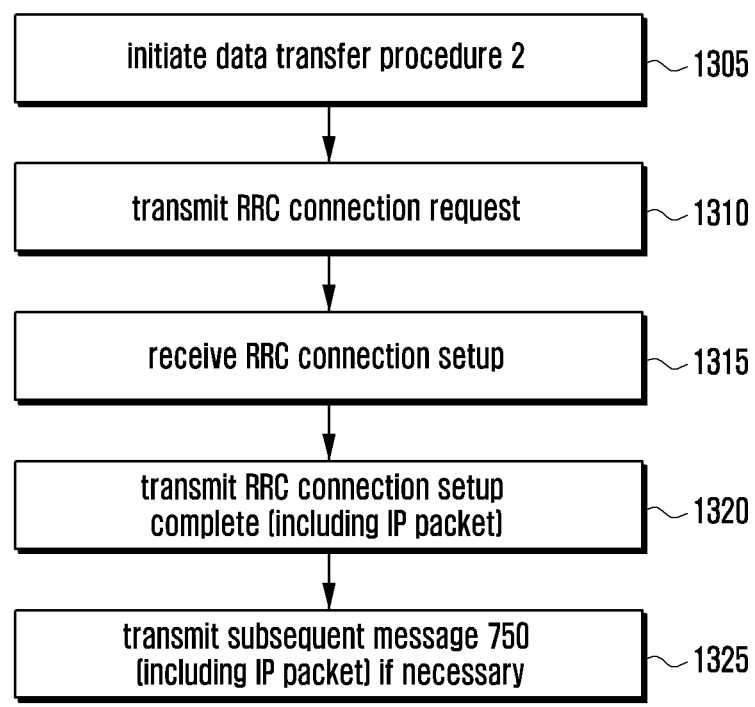
FIG. 13 is a drawing illustrating the UE operation to which another modified security 1 procedure is applied.

FIG. 13 shows the operation of the UE 135 in the case that the modified data transfer procedure 2 is used.

If the aforementioned short data transfer procedure invoke condition is fulfilled, the UE 135 initiates the modified data transfer procedure 2 at operation 1305.

The UE 135 transmits the RRC connection request message in the random access procedure at operation 1310. The message indicates the reason of the RRC connection setup procedure. The UE 135 may inform that the message is for the short data transfer procedure. The RRC connection complete message may also indicate the required of the short data transfer procedure.

If the RRC connection setup message is received, the UE 135 performs following operations at operation 1315.

The UE establishes SRB 1 according to the information received in the RRC connection setup message.

The UE notifies the higher layer of the short data transfer capability (manages EPS bearer data transfer). Then the EPS bearer management entity sends the NAS layer the IP packet.

The NAS layer generates the service request type 2 message and the IP NAS message. The IP NAS message format is identical with the message 750. The NAS layer applies the integrity protection to the service request type 2 message and ciphers the IP NAS message with the current NAS security key and other variables.

The NAS layer delivers the service type 2 message and the IP NAS message to the RRC layer.

The RRC builds the RRC connection setup complete message at operation 1320. The RRC connection setup complete message includes the following information.

Routing information for determining MME 125 to which the eNB 105 routes the NAS message (selectedPLMN-Identity, registeredMME).

dedicatedInfoNAS1 as the service request type 2 message and dedicatedInfoNAS2 as the IP NAS message.

Alternatively, if the short data transfer procedure is not indicated by the RRC connection request message, it may be indicated by this message.

If the RRC connection setup complete message cannot be transmitted in one MAC PDU (i.e. the message is segmented to be transmitted with a plurality of MAC PDUs), the UE 135 may include the following information in the MAC PDU carrying the first part of the RRC connection setup complete message.

Information indicating residual size of the RRC connection setup complete message.

channel condition-related information. It may be the RSRP measurement result of the serving cell. It may also be the information processed based On RSRB like CQI. The eNB 105 allocates the resource for the RRC connection setup complete message to the UE 135 based on this information.

The UE 135 sends the RRC connection setup complete message through the ARQ-protected SRB 1.

The UE 135 configures the message 750 with the data occurring on the same EPS bearer and sends the message to the eNB 105 at operation 1325.

Figure 14:
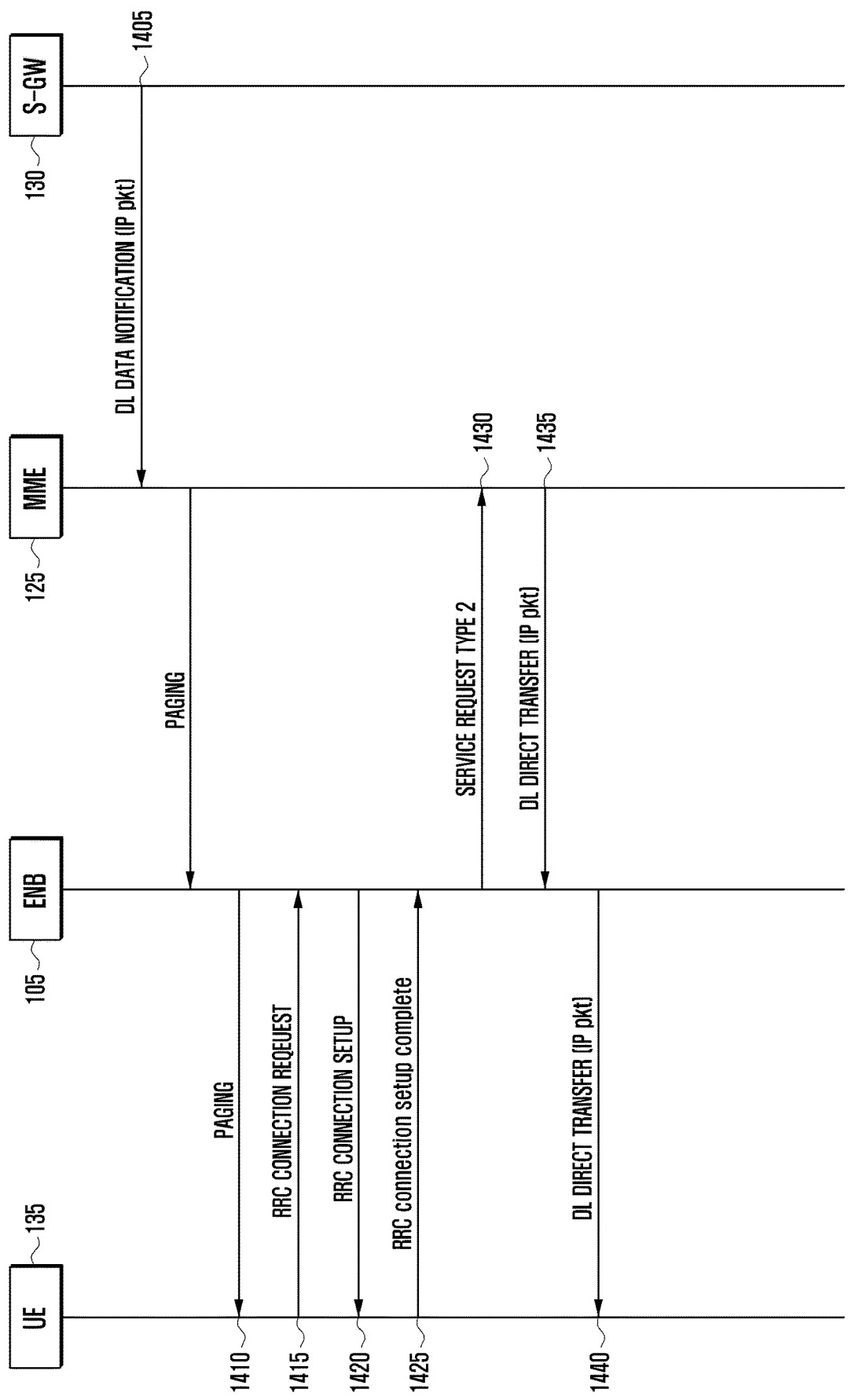
FIG. 14 is a drawing illustrating entire operation of processing Mobile Terminated call of embodiment 1.

FIG. 14 shows the mobile terminated call (mobile terminated case) operation.

The S-GW 130 has the information on the EPS bearer whether it is for short data transfer procedure. The IP packet arrives at the S-GW 130. If the IP packet is transmitted for the EPS bearer for the short data transfer, the S-GW 130 sends the MME 125 the IP packet in the DL DATA NOTIFICATION at operation 1405. The MME 125 stores the IP packet and performs the paging procedure to the eNBs at operation 1410. The paging message may include the indicator for indicating the message is transmitted for the short data transfer procedure. If the paging message is received, the eNB 105 transmits the paging message through the air interface.

When the paging message addressed to the UE 135 is received, the UE 135 transmits the RRC connection request message through random access procedure at operation 1415. The eNB 105 transmits the RRC connection setup message at operation 1420. If the RRC connection setup message is received, the UE 135 establishes the SRB 1 and builds the service request type 2 message. The UE 1350 multiplexes the service request type 2 message with the RRC connection setup complete message and sends the multiplexed message through the SRB 1. If the RRC connection setup complete message is received, the eNB 105 determines a MME 125 to which the service request type 2 message is delivered. The eNB 105 generate an appropriate S1 message and includes the service request type 2 message therein. The eNB 105 sends the MME 125 the S1 message at operation 1430. The MME 125 performs integrity check. If the integrity check is successful, the eNB 105 ciphers the stored IP packet with the security key indicated by the KSI in the service request type 2 message. The MME 125 generates an NAS IIP message. The MME 125 generates a DL DIRECT TRANSFER message including the IP packet at operation 1435 and sends the message to the eNB 105 at operation 1435. The eNB 105 generates the DL DIRECT TRANSFER message including the NAS IP message and sends the message to the UE 135. The UE 135 receives the NAS IP message included in the DL DIRECT TRANSFER message. The NAS layer of the UE 135 deciphers the NAS IP message and delivers the deciphered message to an appropriate entity (i.e. IP layer of the UE 135).

Embodiment 2

The embodiment 2 of the present disclosure proposes a method and apparatus for generating a special DRB in the RRC connection setup procedure and transmitting IP packets through the specially DRB.

Figure 15:
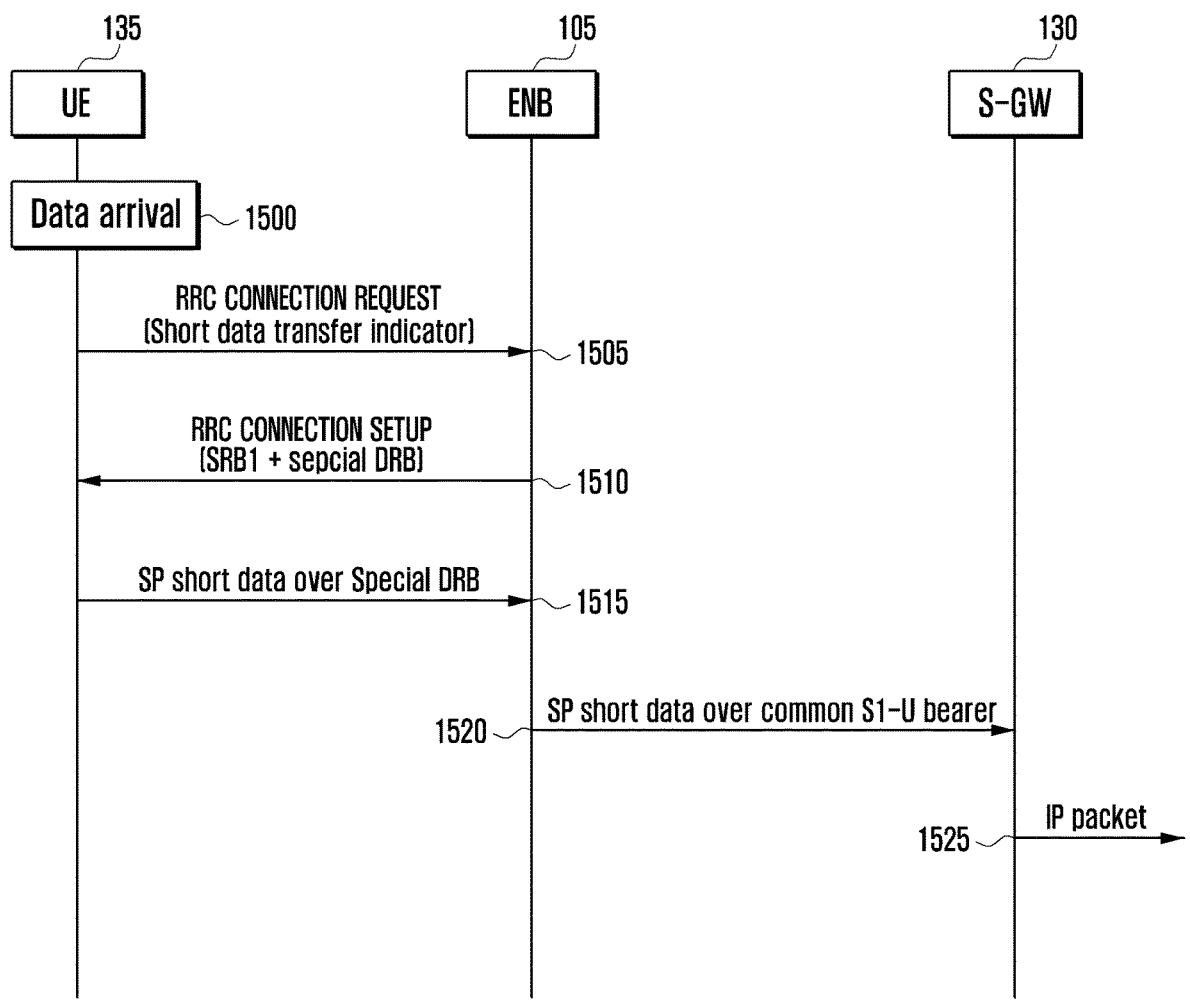
FIG. 15 is a drawing illustrating entire operation of embodiment 2.

FIG. 15 is a flowchart illustrating a data transmission procedure according to the embodiment 2.

A data occurs on the EPS bearer established for use of the data transfer procedure 3 at operation 1500. The data transfer procedure 3 is characterized as follows.

Data transfer without security 2 establishment
Data transfer without DRB setup

The UE 135 generates an RRC connection request message and transmits the message through random access procedure at operation 1505. The RRC connection request message includes an indicator for indicating that the message is generated for short data transfer procedure and a special DRB has to be established in the RRC connection setup procedure.

If the RRC connection request message including the short data transfer indicator, the eNB 105 performs following operations at operation 1510.

Perform Call Admission Control. If it is possible to admit the request, the eNB 105 performs the following operations. Otherwise, the eNB 105 rejects the RRC connection request.

Determine SRB1 configuration

Determine special DRB configuration. The special DRB includes a PDCP entity and an RLC AM entity. The PDCP entity and RLC AM entity configurations are determined in the way of satisfying the QoS requirements for short data transfer (i.e. high reliability and delay at low or intermediate level).

Establish SRB 1 and special DRB according to the determined configuration.

Generate RRC connection setup message based on the SRB 1 and special DRB configuration and transmit the RRC connection setup message.

If the RRC connection setup message is received, the UE 135 performs the following operations at operation 1515.

Establish SRB 1 and special DRB according to the received configuration information The RRC notifies the higher layer of availability of data transmission The higher layer sends the IP packet to the special DRB.

The special DRB processes the IP packet. Particularly, the special DRB adds the following information to the IP packet.

Routing information (i.e. IP address) of the S-GW 130 to which the IP packet has to be sent.

Figure 16:
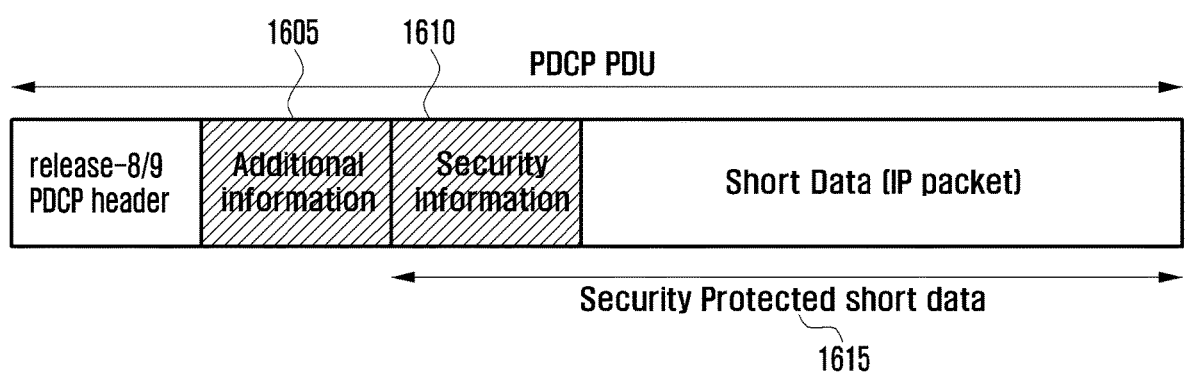
FIG. 16 is a diagram illustrating a data format of the special DRB.

The above information may added by a predetermined protocol entity of the special DRB. For example, the information may be included in the PDCP header as shown in FIG. 16.

REL-8/9 PDCP header including PDCP serial number

The additional information 1605 is the routing information of the related S-GW 130.

The security information 1610 may be added by other protocol entity performing the ciphering.

The security information may include the information on the variables such as COUNT and ciphering key.

Perform the operation necessary for transmitting the short data through the special DRB. The necessary operation may include requesting for scheduling and reporting the size of the short data (including L2 header length as far as possible).

When uplink grant for new transmission is possible, the UE 135 transmits the short data through the special DRB.

If the short data is received through the special DRB, the eNB 105 performs the following operations.

Determine the S-GW 130 to which the security protected short data (hereinafter, referred SP short data) 1615 based on the address of the S-GW 130 in the additional information.

Transmit the SP short data to the S-GW 130 through the common S1-U bearer. There may be a plurality of S-GWs connected to the eNB 105. The eNB 105 has at least one common S1-U bearer(s) for each S-GW 130. The eNB 105 determines the S-GW 130 to which the SP short data has to be transmitted based on the S-GW 130 address included in the additional information 1605.

When transmitting the SP short data through the common S1-U bearer, the eNB 105 adds necessary information to the SP short data such that the S-GW 130 is capable of identifying the UE 135 from which the SP short data is transmitted. This information may be TMSI of the UE 135. The information also may be included in the security information 1610 by the UE 135.

If the SP short data is received through the S1-U bearer, the S-GW 130 performs following operations at operation 1525.

Check the UE identifier and deliver the SP short data to an internal processor configured to process the SP short data in the UE 135.

The processor deciphers the SP short data using the security information added to the received SP short data.

After deciphering, the S-GW 130 routes the IP packet to the destination.

Figure 17:
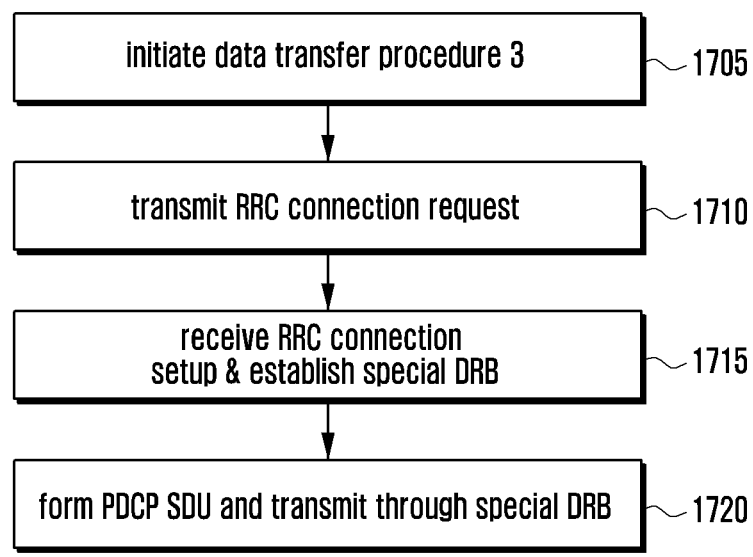
FIG. 17 is a drawing illustrating a UE operation of embodiment 2.

FIG. 17 is a flowchart illustrating data transmission/reception procedure of the UE 135.

If the aforementioned short data transfer procedure invoke condition is fulfilled, the UE 135 initiates the modified data transfer procedure 3 at operation 1705.

The UE 135 transmits the RRC connection request message through a random access procedure at operation 1710. This message includes the reason of the RRC connection setup procedure. The UE 135 informs that the message is transmitted for the short data transfer procedure.

If the RRC connection setup message is received, the UE 135 performs the following operations at operation 1715.

The UE 135 establishes an SRB 1 according to the information received in the RRC connection setup message.

The UE establishes a special DRB according to the information received in the RRC connection setup message. The difference between the special DRB and the normal DRB is that the special DRB is established in the middle of the RRC connection establishment procedure while the normal DRB is established in the middle of the RRC connection reconfiguration procedure.

The UE notifies the higher layer of the availability of the short data transfer (manages EPS bearer data transfer). The EPS bearer management entity sends the IP packet to the special DRB.

The special DRB generates a PDCP SDU with the IP packet. The additional information and security information are added to the IP packet which is ciphered using the information included in the security information.

The additional information include the routing information to the related S-GW 130.

The UE 135 sends the PDCP SDU through the special DRB at operation 1720. From then on, the UE 135 transmits the IP packet of the EPS bearer using the special DRB.

Figure 18:
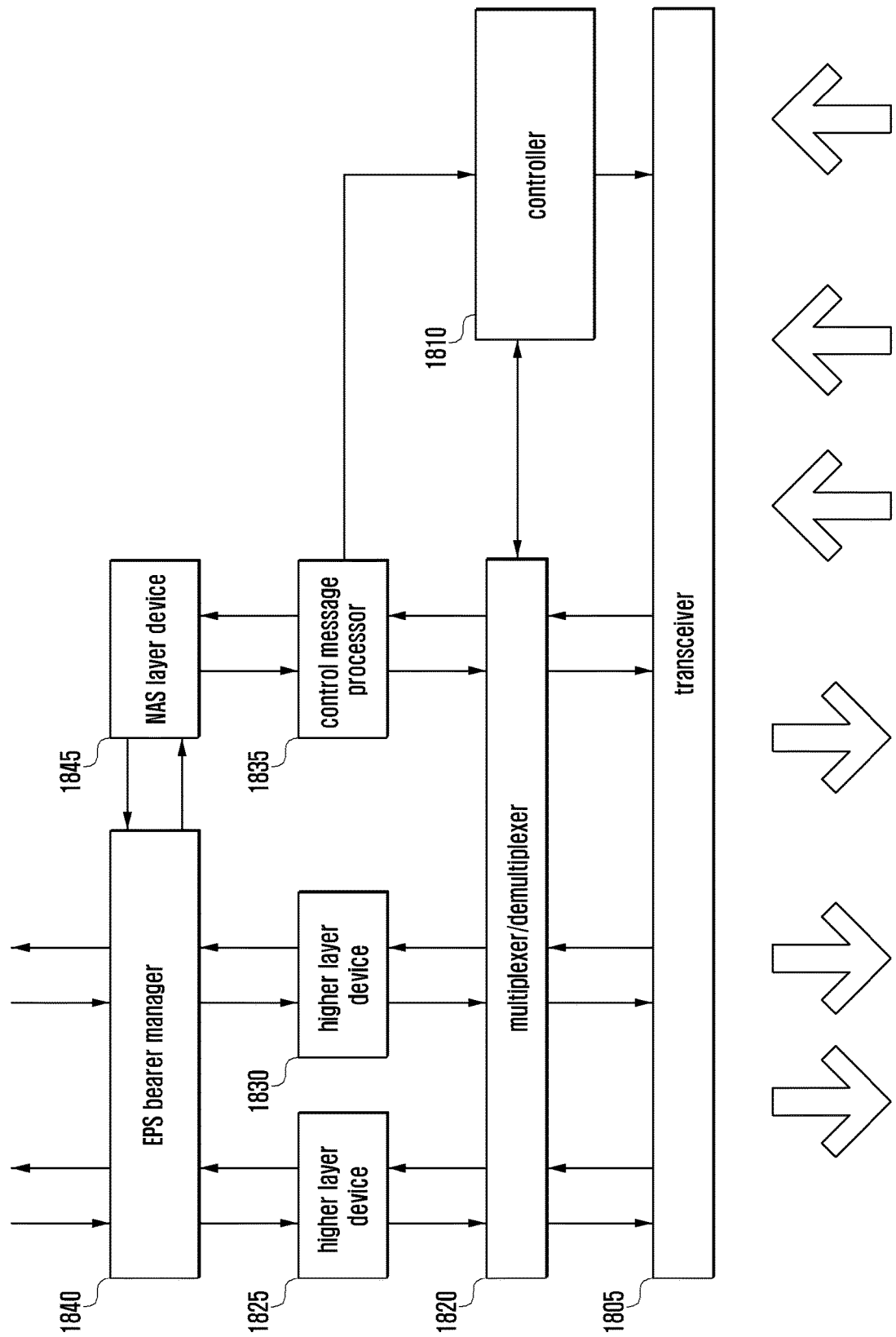
FIG. 18 is a diagram illustrating the UE device according to an embodiment of the present disclosure.

FIG. 18 is a block diagram illustrating a configuration of the UE 135 according to an embodiment of the present disclosure.

Referring to FIG. 18, the UE 135 according to an embodiment of the present disclosure includes a transceiver 1805, a controller 1810, a multiplexer/demultiplexer 1815, a control message processor 1830, higher layer processors 1820 and 1825, an EPS bearer manager 1840, and a NAS layer device 1845.

The transceiver 180 receives data and predetermined control signals through a downlink channel of the serving cell and transmits data and predetermined control signals through an uplink channel. In the case that multiple serving cells are configured, the transceiver 1805 performs data and control signal transmission/reception through multiple serving cells.

The multiplexer/demultiplexer 1815 multiplexes the data generated by the higher layer processors 1820 and 1825 and the control message processor 1830 and demultiplexes the data received by the transceiver 1805 to deliver the demultiplexed data to appropriate higher layer processors 1820 and 1825 and control message processor 1830.

The control message processor 1830 is an RRC layer device and takes an action necessary for processing the control message received from the eNB 105. For example, if the RRC connection setup message is received, it establishes SRB1 and special DRB.

The higher layer processors 1820 and 1825 are DRB devices and may be formed per service. They process the data generated by the user services such as File Transfer Protocol (FTP) and Voice over Internet Protocol (VoIP) and sends the processed data to the multiplexer/demultiplexer 1815 or process the data from the multiplexer/demultiplexer 1815 and sends the processed data to the service applications of the higher layer. One service may be mapped to one EPS bearer and one higher layer processor one by one. If a certain EPS bearer uses the data transfer procedure 2 or 3, no higher layer process is configured for the corresponding EPS bearer.

The controller 1810 controls the transceiver 1805 and the multiplexer/demultiplexer 1815 to perform uplink transmission using an appropriate transmission resource at an appropriate timing by checking the scheduling command, e.g. uplink grant, received through the transceiver 1805.

The EPS bearer manager 1840 determines whether to apply the data transfer procedure 2 or 3 and, if it is determined to apply any of the data transfer procedures, sends the IP packet to the RRC layer device or special DRB device.

Figure 19:
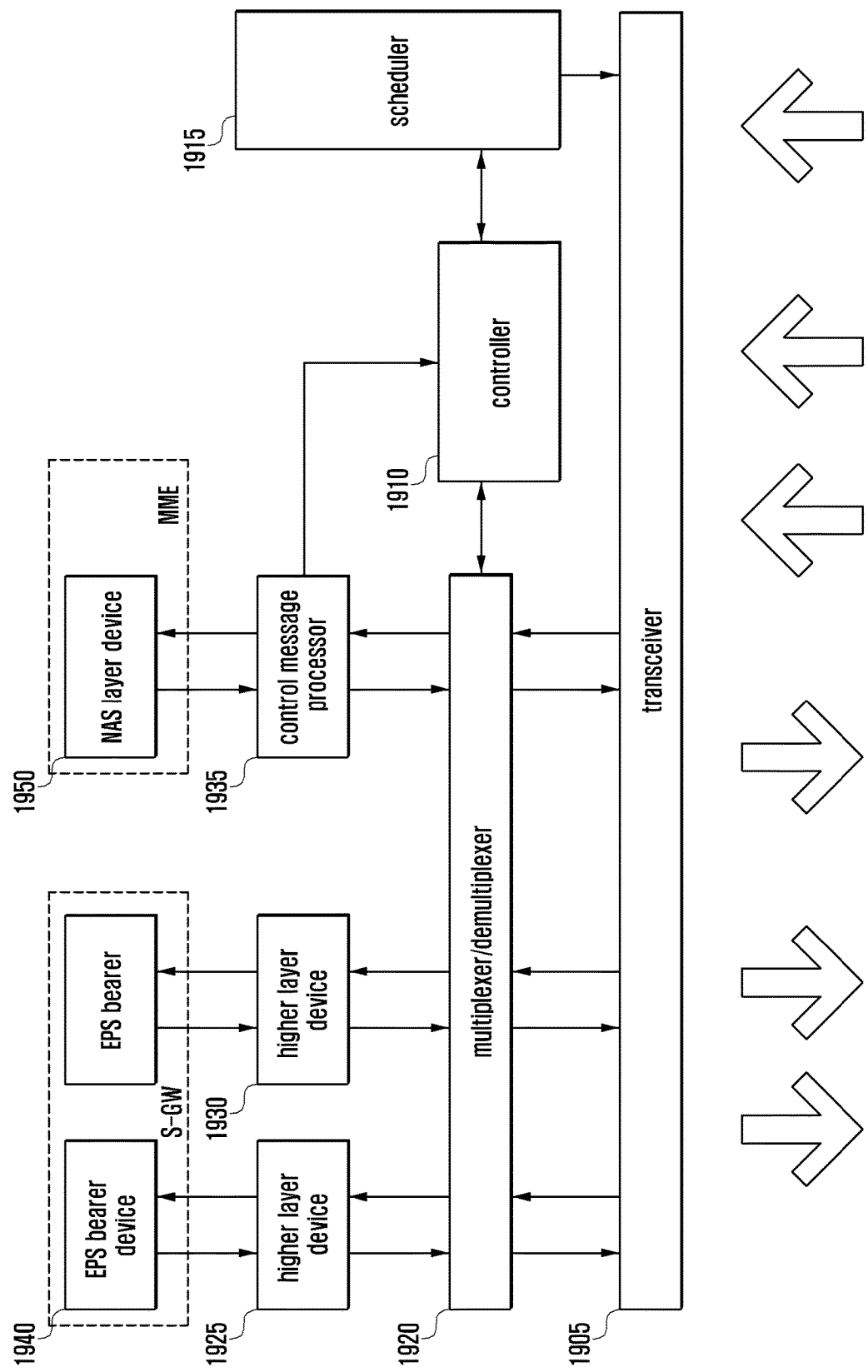
FIG. 19 is a diagram illustrating the network device according to an embodiment of the present disclosure.

FIG. 19 is a block diagram illustrating a configuration of the eNB 105, MME 125, and S-GW 130 according to an embodiment of the present disclosure, and the eNB 105 of FIG. 19 includes a transceiver 1905, a controller 1910, a multiplexer/demultiplexer 1920, a control message processor 1935, higher layer processors 1925 and 1930, a scheduler 1915, EPS bearer devices 1940 and 1945, and a NAS layer device 1950. The EPS bearer devices located at the S-GW 130, and the NAS layer device is located at the MME 125.

The transceiver 1905 transmits data and predetermined control signals through a downlink carrier and receives data and predetermined control signals through an uplink carrier. In the case that a plurality of carriers are configured, the transceiver 1905 may transmit and received data and control signals through multiple carriers.

The multiplexer/demultiplexer 1920 multiplexes the data generated by the higher layer processors 1925 and 1930 and the control message processor 1935 and demultiplexes the data received by the transceiver 1905 to deliver the demultiplexed data to appropriate higher layer processors 1925 and 1930, the control message processor 1935, and the controller 1910. The control message processor 1935 processes the control message transmitted by the UE 135 to take a necessary action and generates the control message addressed to the UE 135 to the lower layer.

The higher layer processors 1925 and 1930 may be configured for the respective EPS bearers and form the RLC PDUs with the data sent by the EPS bearer device and deliver the RLC PDUs to the multiplexer/demultiplexer 1920 and converts the RLC PDUs from the multiplexer/ demultiplexer 1920 to the PDCP SDUs and delivers the PDCP SDUs to the EPS bearer device.

The scheduler allocates transmission resource to the UE 135 at a predetermined timing in consideration of the buffer status and the channel state of the UE 135 and processes the signal received from the UE 135 and to be transmitted to the UE 135.

The EPS bearer device is configured per EPS bearer and processes the data from the higher layer processes to transmit the processed data to the next network node.

The higher layer processors and the EPS bearer devices are connected to each other through S1-U bearer. The higher layer processor corresponding to the special DRB is connected to the EPS bearer for the special DRB through the common S1-U bearer.

The NAS layer device processes the IP packet included in the NAS message and sends the IP packet to the S-GW 130.

What is claimed is:

1. A method performed by a terminal in a wireless communication system, the method comprising:
    identifying whether uplink data occurs or not;
    determining whether a terminal is in an idle state or not; and
    transmitting, to a base station, a message associated with a radio resource control (RRC) including a non-access stratum (NAS) message, in case that the uplink data occurs and the terminal is in the idle state,
    wherein the NAS message includes the uplink data, and
    wherein the NAS message is integrity protected and the uplink data included in the NAS message is ciphered.

2. The method of claim 1, wherein the idle state is a connection management idle (CM-IDLE) state.

3. The method of claim 1, wherein the message is for confirming a completion of an RRC procedure.

4. The method of claim 1, wherein the message further comprises core network entity information, and
    wherein the core network entity information comprises routing information for determining a core network entity to which the base station routes the NAS message.

5. The method of claim 1, wherein the message is transmitted in case that a predefined condition is fulfilled.

6. A terminal in a wireless communication system, the terminal comprising:
    a transceiver; and
    at least one processor configured to:
        identify whether uplink data occurs or not,
        determine whether a terminal is in an idle state or not, and
        transmit, to a base station via the transceiver, a message associated with a radio resource control (RRC) including a non-access stratum (NAS) message, in case that the uplink data occurs and the terminal is in the idle state,
    wherein the NAS message includes the uplink data, and
    wherein the NAS message is integrity protected and the uplink data included in the NAS message is ciphered.

7. The terminal of claim 6, wherein the idle state is a connection management idle (CM-IDLE) state.

8. The terminal of claim 6, wherein the message is for confirming a completion of an RRC procedure.

9. The terminal of claim 6, wherein the message further comprises core network entity information, and
    wherein the core network entity information comprises routing information for determining a core network entity to which the base station routes the NAS message.

10. The terminal of claim 6, wherein the message is transmitted in case that a predefined condition is fulfilled.

11. A method performed by a network device in a wireless communication system, the method comprising:
    receiving, from a terminal, a message associated with a radio resource control (RRC) including a non-access stratum (NAS) message, in case that uplink data occurs and the terminal is in an idle state, wherein the NAS message includes the uplink data; and
    transmitting, to a core network entity, the NAS message including the uplink data,
    wherein the NAS message is integrity protected and the uplink data included in the NAS message is ciphered.

12. The method of claim 11, wherein the idle state is a connection management idle (CM-IDLE) state.

13. The method of claim 11, wherein the message is for confirming a completion of an RRC procedure.

14. The method of claim 11, wherein the message further comprises core network entity information.

15. A network device in a wireless communication system, the network device comprising:
    a transceiver; and
    at least one processor configured to:
        receive, from a terminal via the transceiver, a message associated with a radio resource control (RRC) including a non-access stratum (NAS) message, in case that uplink data occurs and the terminal is in an idle state, wherein the NAS message includes the uplink data, and
        transmit, to a core network entity via the transceiver, the NAS message including the uplink data,
    wherein the NAS message is integrity protected and the uplink data included in the NAS message is ciphered.

16. The network device of claim 15, wherein the idle state is a connection management idle (CM-IDLE) state.

17. The network device of claim 15, wherein the message is for confirming a completion of an RRC procedure.

18. The network device of claim 15, wherein the message further comprises core network entity information.

* * * * *